(12) United States Patent
Bridges et al.

(10) Patent No.: US 9,529,083 B2
(45) Date of Patent: *Dec. 27, 2016

(54) THREE-DIMENSIONAL SCANNER WITH ENHANCED SPECTROSCOPIC ENERGY DETECTOR

(71) Applicant: FARO Technologies, Inc., Lake Mary, FL (US)

(72) Inventors: Robert E. Bridges, Kennett Square, PA (US); Reinhard Becker, Ludwigsburg, DE (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,063

(22) Filed: Aug. 10, 2015

(65) Prior Publication Data

US 2015/0369917 A1    Dec. 24, 2015

Related U.S. Application Data

(63) Continuation-in-part of application No. 14/257,216, filed on Apr. 21, 2014, now Pat. No. 9,113,023, which
(Continued)

(30) Foreign Application Priority Data

Nov. 20, 2009  (DE) .................. 10 2009 055 988

(51) Int. Cl.
*H04N 1/04*     (2006.01)
*G01S 17/02*    (2006.01)
(Continued)

(52) U.S. Cl.
CPC ............ *G01S 17/023* (2013.01); *G01S 7/4817* (2013.01); *G01S 17/89* (2013.01); *H04N 1/00827* (2013.01)

(58) Field of Classification Search
CPC ...... G01S 17/89; G01S 17/08; G01N 13/0257; G01N 13/0422; G01N 5/147; G01N 5/23238; G01N 13/0029; G01N 13/0037; G01N 13/0051; G01N 13/0275; G01N 13/0296; G01N 1/0283; G01N 1/02835; G01N 1/02895
(Continued)

(56) References Cited

U.S. PATENT DOCUMENTS 1,535,312 A    4/1925   Hosking
1,538,758 A    5/1925   Taylor
(Continued)

FOREIGN PATENT DOCUMENTS

AT         508635 A1        3/2011
AU      2005200937 A1       9/2006
(Continued)

OTHER PUBLICATIONS

Second German Office Action for DE Application Serial No. 10 2009 015 922.3; Dated Dec. 2, 2013.
(Continued)

*Primary Examiner* — Negussie Worku
(74) *Attorney, Agent, or Firm* — Cantor Colburn LLP

(57) ABSTRACT

A laser scanner that determines three-dimensional points in an environment further includes a spectrometer for determining the wavelength spectrum of chemical substances in the environment.

20 Claims, 10 Drawing Sheets

Related U.S. Application Data is a continuation-in-part of application No. 13/510,020, filed as application No. PCT/EP2010/006867 on Nov. 11, 2010, now Pat. No. 8,705,016, application No. 14/822,063, which is a continuation-in-part of application No. 14/257,214, filed on Apr. 21, 2014, now Pat. No. 9,210,288, which is a continuation-in-part of application No. 13/510,020, filed on Jun. 15, 2012, now Pat. No. 8,705,016.

(60) Provisional application No. 61/299,166, filed on Jan. 28, 2010.

(51) Int. Cl.
  *G01S 17/89* (2006.01)
  *G01S 7/481* (2006.01)
  *H04N 1/00* (2006.01)

(58) Field of Classification Search
  USPC ....... 356/5.01, 622; 382/104, 106, 100, 103, 382/118, 154, 167, 224, 272, 274; 348/46, 348/E7.085, 135, E13.074, 136, 370, 39, 43, 47, 348/77, 484
  See application file for complete search history.

(56) References Cited

U.S. PATENT DOCUMENTS

| | | | |
|---|---|---|---|
| 1,918,813 | A | 7/1933 | Kinzy |
| 2,316,573 | A | 4/1943 | Egy |
| 2,333,243 | A | 11/1943 | Glab |
| 2,702,683 | A | 2/1955 | Green et al. |
| 2,748,926 | A | 6/1956 | Leahy |
| 2,983,367 | A | 6/1958 | Paramater et al. |
| 2,924,495 | A | 9/1958 | Haines |
| 2,966,257 | A | 12/1960 | Littlejohn |
| 3,066,790 | A | 12/1962 | Armbruster |
| 3,447,852 | A | 6/1969 | Barlow |
| 3,458,167 | A | 7/1969 | Cooley, Jr. |
| 3,830,567 | A | 8/1974 | Riegl |
| 3,899,145 | A | 8/1975 | Stephenson |
| 3,945,729 | A | 3/1976 | Rosen |
| 4,138,045 | A | 2/1979 | Baker |
| 4,178,515 | A | 12/1979 | Tarasevich |
| 4,340,008 | A | 7/1982 | Mendelson |
| 4,379,461 | A | 4/1983 | Nilsson et al. |
| 4,413,907 | A | 11/1983 | Lane |
| 4,424,899 | A | 1/1984 | Rosenberg |
| 4,430,796 | A | 2/1984 | Nakagawa |
| 4,457,625 | A | 7/1984 | Greenleaf et al. |
| 4,506,448 | A | 3/1985 | Topping et al. |
| 4,537,233 | A | 8/1985 | Vroonland et al. |
| 4,544,236 | A | 10/1985 | Endo |
| 4,561,776 | A | 12/1985 | Pryor |
| 4,606,696 | A | 8/1986 | Slocum |
| 4,659,280 | A | 4/1987 | Akeel |
| 4,663,852 | A | 5/1987 | Guarini |
| 4,664,588 | A | 5/1987 | Newell et al. |
| 4,667,231 | A | 5/1987 | Pryor |
| 4,676,002 | A | 6/1987 | Slocum |
| 4,714,339 | A | 12/1987 | Lau et al. |
| 4,733,961 | A | 3/1988 | Mooney |
| 4,736,218 | A | 4/1988 | Kutman |
| 4,751,950 | A | 6/1988 | Bock |
| 4,767,257 | A | 8/1988 | Kato |
| 4,790,651 | A | 12/1988 | Brown et al. |
| 4,816,822 | A | 3/1989 | Vache et al. |
| 4,870,274 | A | 9/1989 | Hebert et al. |
| 4,882,806 | A | 11/1989 | Davis |
| 4,891,509 | A | 1/1990 | Jones et al. |
| 4,954,952 | A | 9/1990 | Ubhayakar et al. |
| 4,982,841 | A | 1/1991 | Goedecke |
| 4,984,881 | A | 1/1991 | Osada et al. |
| 4,996,909 | A | 3/1991 | Vache et al. |
| 4,999,491 | A | 3/1991 | Semler et al. |
| 5,021,641 | A | 6/1991 | Swartz et al. |
| 5,025,966 | A | 6/1991 | Potter |
| 5,027,951 | A | 7/1991 | Johnson |
| 5,068,971 | A | 12/1991 | Simon |
| 5,069,524 | A | 12/1991 | Watanabe et al. |
| 5,155,684 | A | 10/1992 | Burke et al. |
| 5,168,532 | A | 12/1992 | Seppi et al. |
| 5,189,797 | A | 3/1993 | Granger |
| 5,205,111 | A | 4/1993 | Johnson |
| 5,211,476 | A | 5/1993 | Coudroy |
| 5,212,738 | A | 5/1993 | Chande et al. |
| 5,213,240 | A | 5/1993 | Dietz et al. |
| 5,216,479 | A | 6/1993 | Dotan et al. |
| 5,218,427 | A | 6/1993 | Koch |
| 5,219,423 | A | 6/1993 | Kamaya |
| 5,239,855 | A | 8/1993 | Schleifer et al. |
| 5,289,264 | A | 2/1994 | Steinbichler |
| 5,289,265 | A | 2/1994 | Inoue et al. |
| 5,289,855 | A | 3/1994 | Baker et al. |
| 5,313,261 | A | 5/1994 | Leatham et al. |
| 5,319,445 | A | 6/1994 | Fitts |
| 5,329,347 | A | 7/1994 | Wallace et al. |
| 5,329,467 | A | 7/1994 | Nagamune et al. |
| 5,332,315 | A | 7/1994 | Baker et al. |
| 5,337,149 | A | 8/1994 | Kozah et al. |
| 5,371,347 | A | 12/1994 | Plesko |
| 5,372,250 | A | 12/1994 | Johnson |
| 5,373,346 | A | 12/1994 | Hocker |
| 5,402,365 | A | 3/1995 | Kozikaro et al. |
| 5,402,582 | A | 4/1995 | Raab |
| 5,412,880 | A | 5/1995 | Raab |
| 5,416,505 | A | 5/1995 | Eguchi et al. |
| 5,430,384 | A | 7/1995 | Hocker |
| 5,446,846 | A | 8/1995 | Lennartsson |
| 5,455,670 | A | 10/1995 | Payne et al. |
| 5,455,993 | A | 10/1995 | Link et al. |
| 5,510,977 | A | 4/1996 | Raab |
| 5,517,297 | A | 5/1996 | Stenton |
| 5,528,505 | A | 6/1996 | Granger et al. |
| 5,535,524 | A | 7/1996 | Carrier et al. |
| 5,563,655 | A | 10/1996 | Lathrop |
| 5,577,130 | A | 11/1996 | Wu |
| 5,611,147 | A | 3/1997 | Raab |
| 5,623,416 | A | 4/1997 | Hocker, III |
| 5,629,756 | A | 5/1997 | Kitajima |
| 5,668,631 | A | 9/1997 | Norita et al. |
| 5,675,326 | A | 10/1997 | Juds et al. |
| 5,677,760 | A | 10/1997 | Mikami et al. |
| 5,682,508 | A | 10/1997 | Hocker, III |
| 5,716,036 | A | 2/1998 | Isobe et al. |
| 5,724,264 | A | 3/1998 | Rosenberg et al. |
| 5,734,417 | A | 3/1998 | Yamamoto et al. |
| 5,745,050 | A | 4/1998 | Nakagawa |
| 5,745,225 | A | 4/1998 | Watanabe et al. |
| 5,752,112 | A | 5/1998 | Paddock et al. |
| 5,754,449 | A | 5/1998 | Hoshal et al. |
| 5,768,792 | A | 6/1998 | Raab |
| 5,793,993 | A | 8/1998 | Broedner et al. |
| 5,804,805 | A | 9/1998 | Koenck et al. |
| 5,825,666 | A | 10/1998 | Freifeld |
| 5,829,148 | A | 11/1998 | Eaton |
| 5,831,719 | A | 11/1998 | Berg et al. |
| 5,832,416 | A | 11/1998 | Anderson |
| 5,844,591 | A | 12/1998 | Takamatsu et al. |
| 5,856,874 | A | 1/1999 | Tachibana et al. |
| 5,887,122 | A | 3/1999 | Terawaki et al. |
| 5,894,123 | A | 4/1999 | Ohtomo et al. |
| 5,898,484 | A | 4/1999 | Harris |
| 5,898,490 | A | 4/1999 | Ohtomo et al. |
| 5,909,939 | A | 6/1999 | Fugmann |
| 5,926,782 | A | 7/1999 | Raab |
| 5,933,267 | A | 8/1999 | Ishizuka |
| 5,936,721 | A | 8/1999 | Ohtomo et al. |
| 5,940,170 | A | 8/1999 | Berg et al. |
| 5,940,181 | A | 8/1999 | Tsubono et al. |
| 5,956,661 | A | 9/1999 | Lefebvre et al. |
| 5,956,857 | A | 9/1999 | Raab |
| 5,969,321 | A | 10/1999 | Danielson et al. |

(56) References Cited

U.S. PATENT DOCUMENTS

| | | |
|---|---|---|
| 5,973,788 A | 10/1999 | Pettersen et al. |
| 5,978,748 A | 11/1999 | Raab |
| 5,983,936 A | 11/1999 | Schwieterman et al. |
| 5,988,862 A | 11/1999 | Kacyra et al. |
| 5,991,011 A | 11/1999 | Damm |
| 5,996,790 A | 12/1999 | Yamada et al. |
| 5,997,779 A | 12/1999 | Potter |
| 6,040,898 A | 3/2000 | Mrosik et al. |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,069,700 A | 5/2000 | Rudnick et al. |
| 6,077,306 A | 6/2000 | Metzger et al. |
| 6,112,423 A | 9/2000 | Sheehan |
| 6,125,337 A | 9/2000 | Rosenberg et al. |
| 6,131,299 A | 10/2000 | Raab et al. |
| 6,134,507 A | 10/2000 | Markey, Jr. et al. |
| 6,138,915 A | 10/2000 | Danielson et al. |
| 6,149,112 A | 11/2000 | Thieltges |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,204,651 B1 | 3/2001 | Marcus et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,339,410 B1 | 1/2002 | Milner et al. |
| 6,349,249 B1 | 2/2002 | Cunningham |
| 6,366,831 B1 | 4/2002 | Raab |
| 6,408,252 B1 | 6/2002 | De Smet |
| 6,418,774 B1 | 7/2002 | Brogaardh et al. |
| 6,438,856 B1 | 8/2002 | Kaczynski |
| 6,442,419 B1 | 8/2002 | Chu et al. |
| 6,445,446 B1 | 9/2002 | Kumagai et al. |
| 6,460,004 B2 | 10/2002 | Greer et al. |
| 6,470,584 B1 | 10/2002 | Stoodley |
| 6,477,784 B2 | 11/2002 | Schroeder et al. |
| 6,480,270 B1 | 11/2002 | Studnicka et al. |
| 6,483,106 B1 | 11/2002 | Ohtomo et al. |
| 6,497,394 B1 | 12/2002 | Dunchock |
| 6,504,602 B1 | 1/2003 | Hinderling |
| 6,512,575 B1 | 1/2003 | Marchi |
| 6,519,860 B1 | 2/2003 | Bieg et al. |
| D472,824 S | 4/2003 | Raab et al. |
| 6,542,249 B1 | 4/2003 | Kofman et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| D479,544 S | 9/2003 | Raab et al. |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,649,208 B2 | 11/2003 | Rodgers |
| 6,650,402 B2 | 11/2003 | Sullivan et al. |
| 6,668,466 B1 | 12/2003 | Bieg et al. |
| 6,675,122 B1 | 1/2004 | Markendorf et al. |
| 6,681,495 B2 | 1/2004 | Masayuki et al. |
| 6,710,859 B2 | 3/2004 | Shirai et al. |
| D490,831 S | 6/2004 | Raab et al. |
| D491,210 S | 6/2004 | Raab et al. |
| 6,750,873 B1 | 6/2004 | Bernardini et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,825,923 B2 | 11/2004 | Hamar et al. |
| 6,826,664 B2 | 11/2004 | Hocker, III et al. |
| 6,856,381 B2 | 2/2005 | Christoph |
| 6,859,269 B2 | 2/2005 | Ohtomo et al. |
| 6,868,359 B2 | 3/2005 | Raab |
| 6,879,933 B2 | 4/2005 | Steffey et al. |
| 6,889,903 B1 | 5/2005 | Koenck |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,914,678 B1 | 7/2005 | Ulrichsen et al. |
| 6,917,415 B2 | 7/2005 | Gogolla et al. |
| 6,920,697 B2 | 7/2005 | Raab et al. |
| 6,922,234 B2 | 7/2005 | Hoffman et al. |
| 6,922,252 B2 | 7/2005 | Harvill et al. |
| 6,925,722 B2 | 8/2005 | Raab et al. |
| 6,931,745 B2 | 8/2005 | Granger |
| 6,935,036 B2 | 8/2005 | Raab et al. |
| 6,935,748 B2 | 8/2005 | Kaufman et al. |
| 6,948,255 B2 | 9/2005 | Russell |
| 6,957,496 B2 | 10/2005 | Raab et al. |
| 6,965,843 B2 | 11/2005 | Raab et al. |
| 6,973,734 B2 | 12/2005 | Raab et al. |
| 6,988,322 B2 | 1/2006 | Raab et al. |
| 6,989,890 B2 | 1/2006 | Riegl et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,029,126 B2 | 4/2006 | Tang |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,069,124 B1 | 6/2006 | Whittaker et al. |
| 7,069,875 B2 * | 7/2006 | Warecki .......... A01K 5/01 119/215 |
| 7,076,420 B1 | 7/2006 | Snyder et al. |
| 7,106,421 B2 | 9/2006 | Matsuura et al. |
| 7,117,107 B2 | 10/2006 | Dorny et al. |
| 7,120,092 B2 | 10/2006 | Del Prado Pavon et al. |
| 7,127,822 B2 | 10/2006 | Kumagai et al. |
| 7,140,213 B2 | 11/2006 | Feucht et al. |
| 7,152,456 B2 | 12/2006 | Eaton |
| 7,174,651 B2 | 2/2007 | Raab et al. |
| 7,180,072 B2 | 2/2007 | Persi et al. |
| 7,184,047 B1 | 2/2007 | Crampton |
| 7,190,465 B2 | 3/2007 | Froehlich et al. |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,200,246 B2 | 4/2007 | Cofer et al. |
| 7,230,689 B2 | 6/2007 | Lau |
| 7,242,590 B1 | 7/2007 | Yeap et al. |
| 7,246,030 B2 | 7/2007 | Raab et al. |
| 7,249,421 B2 | 7/2007 | MacManus et al. |
| 7,256,899 B1 | 8/2007 | Faul et al. |
| 7,269,910 B2 | 9/2007 | Raab et al. |
| D551,943 S | 10/2007 | Hodjat et al. |
| 7,285,793 B2 | 10/2007 | Husted |
| 7,296,364 B2 | 11/2007 | Seitz et al. |
| 7,296,955 B2 | 11/2007 | Dreier |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| D559,657 S | 1/2008 | Wohlford et al. |
| 7,319,512 B2 | 1/2008 | Ohtomo et al. |
| 7,337,344 B2 | 2/2008 | Barman et al. |
| 7,342,650 B2 | 3/2008 | Kern et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,400,384 B1 | 7/2008 | Evans et al. |
| 7,403,268 B2 | 7/2008 | England et al. |

(56) References Cited

U.S. PATENT DOCUMENTS

| | | |
|---|---|---|
| 7,430,068 B2 | 9/2008 | Becker et al. |
| 7,441,341 B2 | 10/2008 | Eaton |
| 7,443,555 B2 | 10/2008 | Blug et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,477,359 B2 | 1/2009 | England et al. |
| 7,480,037 B2 | 1/2009 | Palmateer et al. |
| 7,508,971 B2 | 3/2009 | Vaccaro et al. |
| 7,515,256 B2 | 4/2009 | Ohtomo et al. |
| 7,525,276 B2 | 4/2009 | Eaton |
| 7,541,830 B2 | 6/2009 | Fahrbach et al. |
| 7,545,517 B2 | 6/2009 | Rueb et al. |
| 7,546,689 B2 | 6/2009 | Ferrari et al. |
| 7,551,771 B2 | 6/2009 | England, III |
| 7,552,644 B2 | 6/2009 | Haase et al. |
| 7,557,824 B2 | 7/2009 | Holliman |
| 7,561,598 B2 | 7/2009 | Stratton et al. |
| 7,564,250 B2 | 7/2009 | Hocker |
| 7,568,293 B2 | 8/2009 | Ferrari |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| 7,626,690 B2 | 12/2009 | Kumagai et al. |
| D607,350 S | 1/2010 | Cooduvalli et al. |
| 7,656,751 B2 | 2/2010 | Rischar et al. |
| 7,659,995 B2 | 2/2010 | Knighton et al. |
| D610,926 S | 3/2010 | Gerent et al. |
| 7,693,325 B2 | 4/2010 | Pulla et al. |
| 7,697,748 B2 | 4/2010 | Dimsdale et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,733,544 B2 | 6/2010 | Becker et al. |
| 7,735,234 B2 | 6/2010 | Briggs et al. |
| 7,743,524 B2 | 6/2010 | Eaton et al. |
| 7,752,003 B2 | 7/2010 | MacManus |
| 7,756,615 B2 | 7/2010 | Barfoot et al. |
| 7,765,707 B2 | 8/2010 | Tomelleri |
| 7,769,559 B2 | 8/2010 | Reichert |
| 7,774,949 B2 | 8/2010 | Ferrari |
| 7,777,761 B2 | 8/2010 | England et al. |
| 7,779,548 B2 | 8/2010 | Ferrari |
| 7,779,553 B2 | 8/2010 | Jordil et al. |
| 7,784,194 B2 | 8/2010 | Raab et al. |
| 7,787,670 B2 | 8/2010 | Urushiya |
| 7,793,425 B2 | 9/2010 | Bailey |
| 7,798,453 B2 | 9/2010 | Maningo et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| 7,834,985 B2 | 11/2010 | Morcom |
| 7,847,922 B2 | 12/2010 | Gittinger et al. |
| RE42,055 E | 1/2011 | Raab |
| 7,869,005 B2 | 1/2011 | Ossig et al. |
| RE42,082 E | 2/2011 | Raab et al. |
| 7,881,896 B2 | 2/2011 | Atwell et al. |
| 7,891,248 B2 | 2/2011 | Hough et al. |
| 7,900,714 B2 | 3/2011 | Milbourne et al. |
| 7,903,261 B2 | 3/2011 | Saint Clair et al. |
| 7,908,757 B2 | 3/2011 | Ferrari |
| 7,935,928 B2 | 5/2011 | Seger et al. |
| 7,974,461 B2 | 7/2011 | England |
| D643,319 S | 8/2011 | Ferrari et al. |
| 7,990,397 B2 | 8/2011 | Bukowski et al. |
| 7,994,465 B1 | 8/2011 | Bamji et al. |
| 7,995,834 B1 | 8/2011 | Knighton et al. |
| 8,001,697 B2 | 8/2011 | Danielson et al. |
| 8,020,657 B2 | 9/2011 | Allard et al. |
| 8,028,432 B2 | 10/2011 | Bailey et al. |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,117,668 B2 | 2/2012 | Crampton et al. |
| 8,123,350 B2 | 2/2012 | Cannell et al. |
| 8,152,071 B2 | 4/2012 | Doherty et al. |
| D659,035 S | 5/2012 | Ferrari et al. |
| 8,171,650 B2 | 5/2012 | York et al. |
| D662,427 S | 6/2012 | Bailey et al. |
| 8,269,984 B2 | 9/2012 | Hinderling et al. |
| 8,276,286 B2 | 10/2012 | Bailey et al. |
| 8,284,407 B2 | 10/2012 | Briggs et al. |
| 8,310,653 B2 | 11/2012 | Ogawa et al. |
| 8,346,392 B2 | 1/2013 | Walser et al. |
| 8,352,212 B2 | 1/2013 | Fetter et al. |
| 8,353,059 B2 | 1/2013 | Crampton et al. |
| D676,341 S | 2/2013 | Bailey et al. |
| 8,384,914 B2 | 2/2013 | Becker et al. |
| D678,085 S | 3/2013 | Bailey et al. |
| 8,391,565 B2 | 3/2013 | Purcell et al. |
| 8,402,669 B2 | 3/2013 | Ferrari et al. |
| 8,497,901 B2 | 7/2013 | Pettersson |
| 8,533,967 B2 | 9/2013 | Bailey et al. |
| 8,537,374 B2 | 9/2013 | Briggs et al. |
| 8,619,265 B2 | 12/2013 | Steffey et al. |
| 8,659,748 B2 | 2/2014 | Dakin et al. |
| 8,659,752 B2 | 2/2014 | Cramer et al. |
| 8,677,643 B2 | 3/2014 | Bridges et al. |
| 8,683,709 B2 | 4/2014 | York |
| 8,699,007 B2 | 4/2014 | Becker et al. |
| 8,705,012 B2 | 4/2014 | Greiner et al. |
| 8,705,016 B2 | 4/2014 | Schumann et al. |
| 8,718,837 B2 | 5/2014 | Wang et al. |
| 8,784,425 B2 | 7/2014 | Ritchey et al. |
| 8,797,552 B2 | 8/2014 | Suzuki et al. |
| 8,830,485 B2 | 9/2014 | Woloschyn |
| 9,001,312 B2 | 4/2015 | Matsubara et al. |
| 9,113,023 B2* | 8/2015 | Bridges ............... H04N 1/036 |
| 2001/0004269 A1 | 6/2001 | Shibata et al. |
| 2002/0032541 A1 | 3/2002 | Raab et al. |
| 2002/0059042 A1 | 5/2002 | Kacyra et al. |
| 2002/0087233 A1 | 7/2002 | Raab |
| 2002/0128790 A1 | 9/2002 | Woodmansee |
| 2002/0143506 A1 | 10/2002 | D'Aligny et al. |
| 2002/0149694 A1 | 10/2002 | Seo |
| 2002/0170192 A1 | 11/2002 | Steffey et al. |
| 2002/0176097 A1 | 11/2002 | Rodgers |
| 2003/0002055 A1 | 1/2003 | Kilthau et al. |
| 2003/0033104 A1 | 2/2003 | Gooche |
| 2003/0043386 A1 | 3/2003 | Froehlich et al. |
| 2003/0053037 A1 | 3/2003 | Blaesing-Bangert et al. |
| 2003/0066954 A1 | 4/2003 | Hipp |
| 2003/0090646 A1 | 5/2003 | Riegl et al. |
| 2003/0125901 A1 | 7/2003 | Steffey et al. |
| 2003/0137449 A1 | 7/2003 | Vashisth et al. |
| 2003/0142631 A1 | 7/2003 | Silvester |
| 2003/0172536 A1 | 9/2003 | Raab et al. |
| 2003/0172537 A1 | 9/2003 | Raab et al. |
| 2003/0179361 A1 | 9/2003 | Ohtomo et al. |
| 2003/0208919 A1 | 11/2003 | Raab et al. |
| 2004/0004727 A1 | 1/2004 | Yanagisawa et al. |
| 2004/0027554 A1 | 2/2004 | Ishinabe et al. |
| 2004/0040166 A1 | 3/2004 | Raab et al. |
| 2004/0119020 A1 | 6/2004 | Bodkin |
| 2004/0135990 A1 | 7/2004 | Ohtomo et al. |
| 2004/0139265 A1 | 7/2004 | Hocker, III et al. |
| 2004/0158355 A1 | 8/2004 | Holmqvist et al. |
| 2004/0162700 A1 | 8/2004 | Rosenberg et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2004/0246589 A1 | 12/2004 | Kim et al. |

(56) References Cited

U.S. PATENT DOCUMENTS

| | | |
|---|---|---|
| 2004/0259533 A1 | 12/2004 | Nixon et al. |
| 2005/0024625 A1 | 2/2005 | Mori et al. |
| 2005/0028393 A1 | 2/2005 | Raab et al. |
| 2005/0046823 A1 | 3/2005 | Ando et al. |
| 2005/0058332 A1 | 3/2005 | Kaufman et al. |
| 2005/0082262 A1 | 4/2005 | Rueb et al. |
| 2005/0085940 A1 | 4/2005 | Griggs et al. |
| 2005/0111514 A1 | 5/2005 | Matsumoto et al. |
| 2005/0141052 A1 | 6/2005 | Becker et al. |
| 2005/0150123 A1 | 7/2005 | Eaton |
| 2005/0166413 A1 | 8/2005 | Crampton |
| 2005/0172503 A1 | 8/2005 | Kumagai et al. |
| 2005/0188557 A1 | 9/2005 | Raab et al. |
| 2005/0190384 A1 | 9/2005 | Persi et al. |
| 2005/0259271 A1 | 11/2005 | Christoph |
| 2005/0283989 A1 | 12/2005 | Pettersson |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0061566 A1 | 3/2006 | Verma et al. |
| 2006/0066836 A1 | 3/2006 | Bridges et al. |
| 2006/0088044 A1 | 4/2006 | Hammerl |
| 2006/0096108 A1 | 5/2006 | Raab et al. |
| 2006/0103853 A1 | 5/2006 | Palmateer |
| 2006/0109536 A1 | 5/2006 | Mettenleiter et al. |
| 2006/0123649 A1 | 6/2006 | Muller |
| 2006/0129349 A1 | 6/2006 | Raab et al. |
| 2006/0132803 A1 | 6/2006 | Clair et al. |
| 2006/0145703 A1 | 7/2006 | Steinbichler et al. |
| 2006/0169050 A1 | 8/2006 | Kobayashi et al. |
| 2006/0169608 A1 | 8/2006 | Carnevali et al. |
| 2006/0170870 A1 | 8/2006 | Kaufman et al. |
| 2006/0182314 A1 | 8/2006 | England et al. |
| 2006/0186301 A1 | 8/2006 | Dozier et al. |
| 2006/0193521 A1 | 8/2006 | England, III et al. |
| 2006/0241791 A1 | 10/2006 | Pokorny et al. |
| 2006/0244746 A1 | 11/2006 | England et al. |
| 2006/0245717 A1 | 11/2006 | Ossig et al. |
| 2006/0279246 A1 | 12/2006 | Hashimoto et al. |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0019212 A1 | 1/2007 | Gatsios et al. |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058154 A1 | 3/2007 | Reichert et al. |
| 2007/0058162 A1 | 3/2007 | Granger |
| 2007/0064976 A1 | 3/2007 | England, III |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson et al. |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163136 A1 | 7/2007 | Eaton |
| 2007/0171394 A1 | 7/2007 | Steiner et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0221522 A1 | 9/2007 | Yamada et al. |
| 2007/0223477 A1 | 9/2007 | Eidson |
| 2007/0229801 A1 | 10/2007 | Tearney et al. |
| 2007/0229929 A1 | 10/2007 | Soreide et al. |
| 2007/0247615 A1 | 10/2007 | Bridges |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott et al. |
| 2008/0068103 A1 | 3/2008 | Cutler |
| 2008/0075325 A1 | 3/2008 | Otani et al. |
| 2008/0075326 A1 | 3/2008 | Otani et al. |
| 2008/0080562 A1 | 4/2008 | Burch et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0218728 A1 | 9/2008 | Kirschner |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0257023 A1 | 10/2008 | Jordil et al. |
| 2008/0263411 A1 | 10/2008 | Baney et al. |
| 2008/0273758 A1 | 11/2008 | Fuchs et al. |
| 2008/0282564 A1 | 11/2008 | Pettersson |
| 2008/0298254 A1 | 12/2008 | Eidson |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0010740 A1 | 1/2009 | Ferrari et al. |
| 2009/0013548 A1 | 1/2009 | Ferrari |
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046752 A1 | 2/2009 | Bueche et al. |
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey et al. |
| 2009/0133494 A1 | 5/2009 | Van Dam et al. |
| 2009/0139105 A1 | 6/2009 | Granger |
| 2009/0157419 A1 | 6/2009 | Bursey |
| 2009/0161091 A1 | 6/2009 | Yamamoto |
| 2009/0177435 A1 | 7/2009 | Heininen |
| 2009/0177438 A1 | 7/2009 | Raab |
| 2009/0185741 A1 | 7/2009 | Nahari et al. |
| 2009/0187373 A1 | 7/2009 | Atwell |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0273771 A1 | 11/2009 | Gittinger |
| 2009/0299689 A1 | 12/2009 | Stubben et al. |

(56) References Cited

U.S. PATENT DOCUMENTS

| | | |
|---|---|---|
| 2009/0323121 A1 | 12/2009 | Valkenburg et al. |
| 2009/0323742 A1 | 12/2009 | Kumano |
| 2010/0030421 A1 | 2/2010 | Yoshimura et al. |
| 2010/0040742 A1 | 2/2010 | Dijkhuis et al. |
| 2010/0049891 A1 | 2/2010 | Hartwich et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0134596 A1 | 6/2010 | Becker |
| 2010/0135534 A1 | 6/2010 | Weston et al. |
| 2010/0148013 A1 | 6/2010 | Bhotika et al. |
| 2010/0188504 A1 | 7/2010 | Dimsdale et al. |
| 2010/0195086 A1 | 8/2010 | Ossig et al. |
| 2010/0207938 A1 | 8/2010 | Yau et al. |
| 2010/0208062 A1 | 8/2010 | Pettersson |
| 2010/0245851 A1 | 9/2010 | Teodorescu |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0321152 A1 | 12/2010 | Argudyaev et al. |
| 2010/0325907 A1 | 12/2010 | Tait |
| 2011/0000095 A1 | 1/2011 | Carlson |
| 2011/0001958 A1 | 1/2011 | Bridges et al. |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0023578 A1 | 2/2011 | Grasser |
| 2011/0025905 A1 | 2/2011 | Tanaka |
| 2011/0043515 A1 | 2/2011 | Stathis |
| 2011/0066781 A1 | 3/2011 | Debelak et al. |
| 2011/0094908 A1 | 4/2011 | Trieu et al. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0112786 A1 | 5/2011 | Desforges et al. |
| 2011/0119025 A1 | 5/2011 | Fetter et al. |
| 2011/0123097 A1 | 5/2011 | Van Coppenolle et al. |
| 2011/0164114 A1 | 7/2011 | Kobayashi et al. |
| 2011/0166824 A1 | 7/2011 | Haisty et al. |
| 2011/0169924 A1 | 7/2011 | Haisty et al. |
| 2011/0173823 A1 | 7/2011 | Bailey et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1 | 7/2011 | Atwell et al. |
| 2011/0178762 A1 | 7/2011 | York |
| 2011/0192043 A1 | 8/2011 | Ferrari et al. |
| 2011/0273568 A1 | 11/2011 | Lagassey et al. |
| 2011/0282622 A1 | 11/2011 | Canter et al. |
| 2011/0288684 A1 | 11/2011 | Farlow et al. |
| 2012/0033069 A1 | 2/2012 | Becker et al. |
| 2012/0035788 A1 | 2/2012 | Trepagnier et al. |
| 2012/0035798 A1 | 2/2012 | Barfoot et al. |
| 2012/0044476 A1 | 2/2012 | Earhart et al. |
| 2012/0046820 A1 | 2/2012 | Allard et al. |
| 2012/0069325 A1 | 3/2012 | Schumann et al. |
| 2012/0069352 A1 | 3/2012 | Ossig et al. |
| 2012/0070077 A1 | 3/2012 | Ossig et al. |
| 2012/0113913 A1 | 5/2012 | Tiirola et al. |
| 2012/0140083 A1 | 6/2012 | Schultz et al. |
| 2012/0140244 A1 | 6/2012 | Gittinger et al. |
| 2012/0154786 A1 | 6/2012 | Gosch et al. |
| 2012/0155744 A1 | 6/2012 | Kennedy et al. |
| 2012/0169876 A1 | 7/2012 | Reichert et al. |
| 2012/0181194 A1 | 7/2012 | McEwan et al. |
| 2012/0210678 A1 | 8/2012 | Alcouloumre et al. |
| 2012/0217357 A1 | 8/2012 | Franke |
| 2012/0229788 A1 | 9/2012 | Schumann et al. |
| 2012/0260512 A1 | 10/2012 | Kretschmer et al. |
| 2012/0260611 A1 | 10/2012 | Jones et al. |
| 2012/0262700 A1 | 10/2012 | Schumann et al. |
| 2012/0287265 A1 | 11/2012 | Schumann et al. |
| 2013/0010307 A1 | 1/2013 | Greiner et al. |
| 2013/0025143 A1 | 1/2013 | Bailey et al. |
| 2013/0025144 A1 | 1/2013 | Briggs et al. |
| 2013/0027515 A1 | 1/2013 | Vinther et al. |
| 2013/0062243 A1 | 3/2013 | Chang et al. |
| 2013/0070250 A1 | 3/2013 | Ditte et al. |
| 2013/0094024 A1 | 4/2013 | Ruhland et al. |
| 2013/0097882 A1 | 4/2013 | Bridges et al. |
| 2013/0125408 A1 | 5/2013 | Atwell et al. |
| 2013/0162472 A1 | 6/2013 | Najim et al. |
| 2013/0201487 A1 | 8/2013 | Ossig et al. |
| 2013/0205606 A1 | 8/2013 | Briggs et al. |
| 2013/0212889 A9 | 8/2013 | Bridges et al. |
| 2013/0222816 A1 | 8/2013 | Briggs et al. |
| 2013/0300740 A1 | 11/2013 | Snyder et al. |
| 2014/0002608 A1 | 1/2014 | Atwell et al. |
| 2014/0049784 A1 | 2/2014 | Woloschyn |
| 2014/0063489 A1 | 3/2014 | Steffey et al. |
| 2014/0078519 A1 | 3/2014 | Steffey et al. |
| 2014/0226190 A1* | 8/2014 | Bridges .............. H04N 1/00827 358/475 |
| 2014/0240690 A1 | 8/2014 | Newman et al. |
| 2014/0300906 A1 | 10/2014 | Becker et al. |
| 2014/0362424 A1* | 12/2014 | Bridges .............. H04N 1/02835 358/484 |
| 2015/0029516 A1 | 1/2015 | Neundorf |
| 2015/0085068 A1 | 3/2015 | Becker et al. |
| 2015/0085301 A1 | 3/2015 | Becker et al. |
| 2015/0109419 A1* | 4/2015 | Vollrath .................. G01C 3/02 348/47 |
| 2015/0160342 A1 | 6/2015 | Zweigle et al. |
| 2015/0160347 A1 | 6/2015 | Zweigle et al. |
| 2015/0160348 A1* | 6/2015 | Zweigle ................ G09B 29/004 356/607 |
| 2015/0241204 A1* | 8/2015 | Steffey ................. G01C 15/002 356/4.01 |
| 2015/0378023 A1* | 12/2015 | Royo Royo .......... G01S 7/4817 356/5.01 |
| 2016/0033643 A1* | 2/2016 | Zweigle .................. G01S 17/36 356/5.01 |

FOREIGN PATENT DOCUMENTS

| | | |
|---|---|---|
| CN | 1133969 A | 10/1996 |
| CN | 1630804 A | 6/2005 |
| CN | 1630805 A | 6/2005 |
| CN | 1735789 | 2/2006 |
| CN | 1812868 A | 8/2006 |
| CN | 1818537 A | 8/2006 |
| CN | 1838102 A | 9/2006 |
| CN | 1839293 A | 9/2006 |
| CN | 1853084 A | 10/2006 |
| CN | 101024286 A | 8/2007 |
| CN | 101156043 A | 4/2008 |
| CN | 101163939 A | 4/2008 |
| CN | 101371099 A | 2/2009 |
| CN | 101511529 A | 8/2009 |
| DE | 2216765 A1 | 4/1972 |
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 4412044 | 10/1995 |
| DE | 19543763 A1 | 5/1997 |
| DE | 19601875 A1 | 7/1997 |
| DE | 19607345 A1 | 8/1997 |
| DE | 19720049 A1 | 11/1998 |
| DE | 19811550 A1 | 9/1999 |
| DE | 19820307 A1 | 11/1999 |
| DE | 19850118 A1 | 5/2000 |
| DE | 19928958 A1 | 11/2000 |
| DE | 10026357 A1 | 1/2002 |
| DE | 20208077 U1 | 5/2002 |
| DE | 10137241 A1 | 9/2002 |

(56) References Cited

FOREIGN PATENT DOCUMENTS

| | | |
|---|---|---|
| DE | 10155488 | 5/2003 |
| DE | 10219054 A1 | 11/2003 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10326848 | 1/2005 |
| DE | 10361870 A1 | 7/2005 |
| DE | 102004015668 B3 | 9/2005 |
| DE | 102004015111 A1 | 10/2005 |
| DE | 102004028090 A1 | 12/2005 |
| DE | 10114126 B4 | 8/2006 |
| DE | 202006005643 U1 | 8/2006 |
| DE | 102004010083 B4 | 11/2006 |
| DE | 102005043931 A1 | 3/2007 |
| DE | 102005056265 A1 | 5/2007 |
| DE | 102006053611 A1 | 5/2007 |
| DE | 102005060967 A1 | 6/2007 |
| DE | 102006023902 | 11/2007 |
| DE | 102006024534 A1 | 11/2007 |
| DE | 102006035292 A1 | 1/2008 |
| DE | 102007037162 A1 | 2/2009 |
| DE | 102008014274 A1 | 8/2009 |
| DE | 102009055988 | 11/2009 |
| DE | 102008039838 A1 | 3/2010 |
| DE | 102005036929 B4 | 6/2010 |
| DE | 102008062763 B3 | 7/2010 |
| DE | 102009001894 A1 | 9/2010 |
| DE | 102009035336 B3 | 11/2010 |
| DE | 102010032723 B3 | 11/2011 |
| DE | 102010032726 B3 | 11/2011 |
| DE | 102010033561 B3 | 12/2011 |
| DE | 102010032725 A1 | 1/2012 |
| DE | 202011051975 U1 | 2/2013 |
| DE | 102012107544 B3 | 5/2013 |
| DE | 102012109481 A1 | 4/2014 |
| EP | 0546784 A2 | 6/1993 |
| EP | 0667549 A2 | 8/1995 |
| EP | 0727642 A1 | 8/1996 |
| EP | 0730210 A1 | 9/1996 |
| EP | 0614517 | 3/1997 |
| EP | 0838696 A1 | 4/1998 |
| EP | 0949524 A1 | 10/1999 |
| EP | 1056987 A1 | 6/2000 |
| EP | 1160539 | 12/2001 |
| EP | 1189124 A1 | 3/2002 |
| EP | 0767357 B1 | 5/2002 |
| EP | 1310764 A2 | 5/2003 |
| EP | 1342989 A2 | 9/2003 |
| EP | 1347267 A1 | 9/2003 |
| EP | 1361414 A1 | 11/2003 |
| EP | 1452279 | 9/2004 |
| EP | 1468791 A1 | 10/2004 |
| EP | 1528410 A1 | 5/2005 |
| EP | 1669713 A1 | 6/2006 |
| EP | 1734425 A2 | 12/2006 |
| EP | 1429109 B1 | 4/2007 |
| EP | 1764579 | 12/2007 |
| EP | 1878543 A2 | 1/2008 |
| EP | 1967930 A2 | 9/2008 |
| EP | 2003419 A1 | 12/2008 |
| EP | 2042905 A1 | 4/2009 |
| GB | 1112941 | 5/1968 |
| GB | 2222695 A | 3/1990 |
| GB | 2336493 A | 10/1999 |
| GB | 2388661 A | 11/2003 |
| GB | 2447258 A | 9/2008 |
| JP | S58171291 A | 10/1983 |
| JP | 61062885 | 3/1986 |
| JP | S61157095 A | 7/1986 |
| JP | H0357911 A | 3/1991 |
| JP | H04115108 A | 4/1992 |
| JP | 04225188 | 8/1992 |
| JP | H04267214 A | 9/1992 |
| JP | 05072477 A | 3/1993 |
| JP | H0572477 A | 3/1993 |
| JP | 06313710 | 11/1994 |
| JP | 1994313710 A | 11/1994 |
| JP | 06331733 | 12/1994 |
| JP | 06341838 | 12/1994 |
| JP | 074950 | 1/1995 |
| JP | 07128051 A | 5/1995 |
| JP | H07229963 A | 8/1995 |
| JP | 0815413 A | 1/1996 |
| JP | 0821714 A | 1/1996 |
| JP | H0815413 A | 1/1996 |
| JP | H08129145 A | 5/1996 |
| JP | H08136849 A | 5/1996 |
| JP | H08262140 A | 10/1996 |
| JP | 09021868 | 1/1997 |
| JP | 1123993 A | 1/1999 |
| JP | 2000121724 A | 4/2000 |
| JP | 2000249546 A | 9/2000 |
| JP | 2000339468 A | 12/2000 |
| JP | 2001013001 A | 1/2001 |
| JP | 2001021303 A | 1/2001 |
| JP | 11231047 | 2/2001 |
| JP | 2011066211 A | 3/2001 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003194526 | 7/2003 |
| JP | 2003202215 A | 7/2003 |
| JP | 2003216255 A | 7/2003 |
| JP | 2003308205 A | 10/2003 |
| JP | 2004109106 A | 4/2004 |
| JP | 2004245832 A | 9/2004 |
| JP | 2004257927 A | 9/2004 |
| JP | 2004348575 A | 12/2004 |
| JP | 2005030937 A | 2/2005 |
| JP | 2005055226 A | 3/2005 |
| JP | 2005069700 A | 3/2005 |
| JP | 2005174887 | 6/2005 |
| JP | 2005517908 | 6/2005 |
| JP | 2005215917 A | 8/2005 |
| JP | 2005257510 A | 9/2005 |
| JP | 2006038683 A | 2/2006 |
| JP | 2006102176 | 4/2006 |
| JP | 2006203404 A | 8/2006 |
| JP | 2006226948 A | 8/2006 |
| JP | 2006241833 A | 9/2006 |
| JP | 2006266821 | 10/2006 |
| JP | 2006301991 A | 11/2006 |
| JP | 2007514943 A | 6/2007 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2008304220 | 12/2008 |
| JP | 2009063339 A | 3/2009 |
| JP | 2009524057 | 6/2009 |
| JP | 2009541758 A | 11/2009 |
| JP | 2010169405 A | 8/2010 |
| JP | 2013516928 A | 5/2013 |
| JP | 2013517508 A | 5/2013 |
| JP | 2013117417 A | 6/2013 |
| JP | 2013543970 A | 12/2013 |
| WO | 8905512 | 6/1989 |
| WO | 9711399 | 3/1997 |
| WO | 0014474 | 3/2000 |
| WO | 0020880 A2 | 4/2000 |
| WO | 0026612 | 5/2000 |
| WO | 0033149 | 6/2000 |
| WO | 0034733 | 6/2000 |
| WO | 0063645 | 10/2000 |
| WO | 0063681 A2 | 10/2000 |
| WO | 0177613 A1 | 10/2001 |
| WO | 02084327 A2 | 10/2002 |
| WO | 02088855 A1 | 11/2002 |
| WO | 02101323 A2 | 12/2002 |
| WO | 2004096502 A1 | 11/2004 |

(56) References Cited

FOREIGN PATENT DOCUMENTS

| | | | |
|---|---|---|---|
| WO | 2005008271 | A2 | 1/2005 |
| WO | 2005059473 | A2 | 6/2005 |
| WO | 2005072917 | A1 | 8/2005 |
| WO | 2005075875 | | 8/2005 |
| WO | 2005100908 | A1 | 10/2005 |
| WO | 2006000552 | A1 | 1/2006 |
| WO | 2006014445 | A1 | 2/2006 |
| WO | 2006051264 | A1 | 5/2006 |
| WO | 2006053837 | A1 | 5/2006 |
| WO | 2007002319 | A1 | 1/2007 |
| WO | 2007012198 | A1 | 2/2007 |
| WO | 2007028941 | | 3/2007 |
| WO | 2007051972 | A1 | 5/2007 |
| WO | 2007087198 | A1 | 8/2007 |
| WO | 2007118478 | A1 | 10/2007 |
| WO | 2007125081 | A1 | 11/2007 |
| WO | 20070125081 | A1 | 11/2007 |
| WO | 2007144906 | A1 | 12/2007 |
| WO | 2008019856 | A1 | 2/2008 |
| WO | 2008027588 | A2 | 3/2008 |
| WO | 2008047171 | A1 | 4/2008 |
| WO | 2008048424 | A2 | 4/2008 |
| WO | 2008052348 | A1 | 5/2008 |
| WO | 2008064276 | A3 | 5/2008 |
| WO | 2008066896 | | 6/2008 |
| WO | 2008068791 | A1 | 6/2008 |
| WO | 2008075170 | A1 | 6/2008 |
| WO | 2008121073 | A1 | 10/2008 |
| WO | 2008157061 | A1 | 12/2008 |
| WO | 2009001165 | A1 | 12/2008 |
| WO | 2009016185 | A1 | 2/2009 |
| WO | 2009053085 | A1 | 4/2009 |
| WO | 2009083452 | A1 | 7/2009 |
| WO | 2009095384 | A2 | 8/2009 |
| WO | 2009123278 | A1 | 10/2009 |
| WO | 2009127526 | A1 | 10/2009 |
| WO | 2009130169 | A1 | 10/2009 |
| WO | 2009149740 | A1 | 12/2009 |
| WO | 2010040742 | A1 | 4/2010 |
| WO | 2010092131 | A1 | 8/2010 |
| WO | 2010108089 | A2 | 9/2010 |
| WO | 2010108644 | A1 | 9/2010 |
| WO | 2010148525 | A1 | 12/2010 |
| WO | 2011000435 | A1 | 1/2011 |
| WO | 2011000955 | A1 | 1/2011 |
| WO | 2011021103 | A1 | 2/2011 |
| WO | 2011029140 | A1 | 3/2011 |
| WO | 2011057130 | A2 | 5/2011 |
| WO | 2011060899 | A1 | 5/2011 |
| WO | 2011090829 | A2 | 7/2011 |
| WO | 2011090895 | A1 | 7/2011 |
| WO | 2012037157 | A2 | 3/2012 |
| WO | 2012061122 | A1 | 5/2012 |
| WO | 2012013525 | A2 | 8/2012 |
| WO | 2012112683 | A2 | 8/2012 |
| WO | 2012125671 | A1 | 9/2012 |
| WO | 2013112455 | A1 | 8/2013 |
| WO | 2014128498 | A2 | 8/2014 |

OTHER PUBLICATIONS

German Office Acton for DE Application No. 102013102.554.4; Dated Jan. 9, 2014.
Germany Office Action for DE Application No. 10 2012 107 544.1; Issued Feb. 1, 2013.
GB Exam and Search Report for Application No. GB1314371.4; Dated Nov. 22, 2013.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Second JP Office Action for JP Patent Application Serial No. 2012-534590; Date of Mailing Nov. 12, 2013.
Japanese Office Action for JP Patent Application Serial No. 2012-501174; Dated Oct. 29, 2013.
ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (r.
Anonymous : So wird's gemacht: Mit T-DSL and Windows XP Home Edition gemeinsam ins Internet (Teil 3) Internet Citation, Jul. 2003, (Jul. 2003), XP002364586, Retrieved from Internet: URL:http://support.microsfot.com/kb/814538/DE/ [retrieved on Jan. 26, 2006]eh.
Brenneke et al: "Using 3D laser range data for slam in outsoor enviornments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2.
Electric-Optical Information Systems, "The Handy Handheld Digitizer" [online], [retrieved on Nov. 29, 2011], http://vidibotics.com/htm/handy.htm.
EO Edmund Optics "Silicon Detectors" (5 pages) 2013 Edmunds Optics, Inc. http://www.edmundoptics.com/electro-optics/detector-components/silicon-detectors/1305[Oct. 15, 2013 10:14:53 AM].
Faro Product Catalog; Faro Arm; 68 pages; Faro Technologies Inc. 2009; printed Aug. 3, 2009.
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retrieved Oct. 21, 2010].
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
GoMeasure3D - Your source for all things measurement, Baces 3D 100 Series Portable CMM from GoMeasure3D, [online], [retrieved Nov. 29, 2011], http://www.gomeasure3d.com/baces100.html.
HYDROpro Navigation, Hydropgraphic Survey Software, Trimble, www.trimble.com, Copyright 1997-2003.
Information on Electro-Optical Information Systems; EOIS 3D Mini-Moire C.M.M. Sensor for Non-Contact Measuring & Surface Mapping; Direct Dimensions, Jun. 1995.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
J.Geng "Structured-Light 3D Surface Imaging: A Tutorial" (pub. Mar. 31, 2011) Advances in Optics and Photonics 3, pp. 128-160; IEEE Intelligent Transportation System Society; 2011 Optical Society of America.
Jasperneite, et al., Enhancements to the Time Synchronization Standard IEEE-1588 for a System of Cascaded Bridges, IEEE, 2004.
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
Laser Reverse Engineering with Microscribe, [online], [retrieved Nov. 29, 2011], http://www.youtube.com/watch? v=8VRz_2aEJ4E&feature=PlayList&p=F63ABF74F30DC81B&playnext=1&playnext_from=PL&index=1.
Leica TPS800 Performance Series—Equipment List, 2004.

(56) References Cited

OTHER PUBLICATIONS

MG Lee; "Compact 3D LIDAR based on optically coupled horizontal and vertical Scanning mechanism for the autonomous navigation of robots" (13 pages) vol. 8037; downloaded from http://proceedings.spiedigitallibraiy.org/ on Jul. 2, 2013.
MicroScan 3D User Guide, RSI GmbH, 3D Systems & Software, Oberursel, Germany, email: info@rsi-gmbh.de, Copyright RSI Roland Seifert Imaging GmbH 2008.
Moog Components Group "Technical Brief; Fiber Optic Rotary Joints" Document No. 303 (6 pages) Mar. 2008; MOOG, Inc. 2008 Canada; Focal Technologies.
MOOG Components Group; "Fiber Optic Rotary Joints; Product Guide" (4 pages) Dec. 2010; MOOG, Inc. 2010.
P Ben-Tzvi, et al "Extraction of 3D Images Using Pitch-Actuated 2D Laser Range Finder for Robotic Vision" (6 pages) BNSDOCID <XP 31840390A_1_>, Oct. 15, 2010.
Romer Measuring Arms; Portable CMMs for the shop floor; 20 pages; Hexagon Metrology, Inc. (2009) http//us.ROMER.com.
RW Boyd "Radiometry and the Detection of Otpical Radiation" (pp. 20-23 ) 1983 Jon wiley & Sons, Inc.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Surman et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.
Trimble—Trimble SPS630, SPS730 and SPS930 Universal Total Stations, [on-line] http://www.trimble.com/sps630_730_930.shtml (1 of 4), [Retrieved Jan. 26, 2010 8:50:29AM].
Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6.
YK Cho, et al. "Light-weight 3D LADAR System for Construction Robotic Operations" (pp. 237-244); 26th International Symposium on Automation and Robotics in Construction (ISARC 2009).
Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.
Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.
Harrison A. et al., "High Quality 3D Laser Ranging Under General Vehicle Motion", 2008 IEEE International Conference on Robotics and Automation, May 19-23, 2008, pp. 7-12, XP031340123.
May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.
Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.
Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.
Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.
Ye, C. et al., "Characterization of a 2-D Laser Scanner for Mobile Robot Obstacle Negotiation" Proceedings / 2002 IEEE International Conference on Robotics and Automation, May 11-15, 2002, Washington, D.C., May 1, 2002, pp. 2512-2518, XP009169742.

Notification of Transmittal of the International Search Report and the Written Opinion of the International Searching Authority; PCT/US2015/025628; European Patent Office; Dated Jun. 16, 2015; 11 pages.
Notification of Transmittal of the International Search Report and Written Opinion of the International Searching Authority, or the Declaration for International Application No. PCT/US2015/015737; Mailed May 8, 2015; pp. 1-10.
Chinese Notification of First Office Action for Chinese Application No. 201080003463.3; Issued Oct. 30, 2012 (translated).
Chinese Office Action for Chinese Application Serial No. 201080047516-1; Date of Issue Apr. 1, 2013.
Germany Office Action for DE Application No. 10 2012 107 544.1; Issued Jan. 2, 2013.
GB Examination Report dated Mar. 27, 2013 for GB Application No. GB1303390.7.
GB Examination Report dated Mar. 27, 2013 for GB Application No. GB1303382.4.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
International Search Report of the International Searching Authority for Application No. PCT/EP2011/003264; Date of Mailing Oct. 19, 2011.
International Search Report of the International Searching Authority for PCT/EP2010/006866; Date of Mailing Mar. 14, 2011.
International Search Report of the International Searching Authority for PCT/EP2010/006868; Date of Mailing Mar. 14, 2011.
International Search Report of the International Searching Authority for PCT/EP2009/050888; Date of Mailing Sep. 15, 2009.
International Search Report of the International Searching Authority for Application No. PCT/US2012/075178; Date of Mailing Apr. 9, 2013.
International Search Report of the International Searching Authority for PCT/EP2009/050887; Date of Mailing May 14, 2009.
International Search Report of the International Searching Authority for Application No. PCT/EP2011/003262; Date of Mailing Sep. 30, 2011.
Langford, et al., "Practical Skills in Forensic Science", Pearson Education Limited, Essex, England, First Published 2005, Forensic Chemistry.
Leica Geosystems, TruStory Forensic Analysis by Albuquerque Police Department, 2006.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.
Merriam-Webster (m-w.com), "Interface". 2012. http://www.merriam-webstercom/dictionary/interface.
Merriam-Webster (m-w.com), "Traverse". 2012. http://www.merriam-webster.com/dictionary/traverse.
Merriam-Webster (m-w.com), "Parts". 2012. http://www.merriam-webstercom/dictionary/parts.
Jasiobedzki, Piotr, "Laser Eye—A New 3D Sensor for Active Vision", SPIE—Sensor Fusion VI, vol. 2059, Sep. 7, 1993 (Sep. 7, 1993), pp. 316-321, XP00262856, Boston, U.S.A., Retrieved from the Internet: URL:http://scitation.aip.org/getpdf/servlet/GetPDFServlet?filetype=pdf&id=PSISDG002059000001000316000001&idtype=cvips&doi=10.117/12.150236&prog=normal>[retrieved on Mar. 8, 2011] the whole document.
"Scanner Basis Configuration for Riegl VQ-250", Riegl Company Webpage, Feb. 16, 2011 (Feb. 16, 2011), XP002693900, Retrieved from the Internet: URL:http://www.riegl.com/uploads/tx_pxpriegldownloads/30_SystemConfiguration_VQ-250_02-11_16-02-2011.pdf [retrieved on Mar. 15, 2013] the whole document.
Se, et al., "Instant Scene Modeler for Crime Scene Reconstruction", MDA, Space Missions, Ontario, Canada, Copyright 2005, IEEE.
The Scene, Journal of The Association for Crime Scene Reconstruction, Apr.-Jun. 2006, vol. 12, Issue 2.
Umeda, K., et al., Registration of Range and Color Images Using Gradient Constraints and Ran Intensity Images, Proceedings of the

(56) References Cited

OTHER PUBLICATIONS

17th International Conference onPatern Recognition (ICPR'04), Copyright 2010 IEEE. [Retrieved online Jan. 28, 2010—IEEE Xplore].
Williams, J.A., et al., Evaluation of a Novel Multiple Point Set Registration Algorithm, Copyright 2000, [Retrieved on Jan. 18, 2010 at 04:10 from IEEE Xplore].
Written Opinion of the International Searching Authority for International Patent Application PCT/EP2010/006867; mailing date Mar. 18, 2011.
Written Opinion of the International Searching Authority for Application No. PCT/EP2006/003010; Date of Mailing Dec. 11, 2006.
Written Opinion of the International Searching Authority for Application No. PCT/EP2011/001662; Date of Mailing May 26, 2011.
Written Opinion of the International Searching Authority for Application No. PCT/US2012/075178; Date of Mailing Apr. 9, 2013.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.
Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003 (Jul. 2003), pp. 72-77, XP002590306.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/ROBOT.2001.932908 ISBN: 978-0-7803-6576-6, the whole document.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.
Chinese Office Action Dated Jun. 2, 2010 with English Translation of the Text for Application No. 2006800540959.
First Office Action and Search Report with English Translation for Chinese Patent Application No. 201080003456.3; Issue Date Jan. 17, 2013.
First Chinese Office Action for Application No. 201080003467.1; Office Action Issue Date Feb. 5, 2013; (translated).
Chinese Publication No. CN 1445509, published Oct. 1, 2003—English Abstract Not Available; EP Equivalent 1347267.
Ingensand, H., Dr., "Introduction to Geodetic Metrology", "Einfuhrung in die Geodatische Messtechnik", Federal Institute of Technology Zurich, Edition 2004, p. 16.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998 (Nov. 2, 1998), Nov. 3, 1998 (Nov. 3, 1998) pp. 343-354, XP 002587995, Proceedings of the SPIE.
FARO Laserscanner LS, Presentation Forensic Package Package, Policeschool of Hessen, Wiesbaden, Germany, Dec. 14, 2005; FARO Technologies, Copyright 2008.
FARO Laser Scanner LS, Recording Reality's Digital Fingerprint, The Measure of Success, Copyright 2005.
Leica Geosystems, FBI Crime Scene Case Study, Opposition of EP Application No. 07785873.6 in Oral Proceedings held on Jun. 27, 2013, Munchen, Germany; D13, p. 5 of Summons, Tony Grissim, Feb. 2006.

Godin, G., et al., A Method for the Registration of Attributed Range Images, Copyright 2001, [Retrieved on Jan. 18, 2010 at 03:29 from IEEE Xplore].
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.
Howard, et al., "Virtual Environments for Scene of Crime Reconstruction and Analysis", Advanced Interfaces Group, Department of Computer Science, University of Manchester, Manchester, UK, Feb. 28, 2000.
International Preliminary Report and Written Opinion for International Application No. PCT/EP2007/005789; Date of Mailing Oct. 30, 2007.
International Preliminary Report on Patentability and Written Opinion for PCT/IB2010/002216; Date of Issuance Jan. 24, 2012.
International Preliminary Report on Patentability and Written Opinion for PCT/EP2009/050887; Date of Issue Sep. 7, 2010.
International Preliminary Report on Patentability and Written Opinion for International Patent Application PCT/IB2010/002226; Date of Issuance Jan. 24, 2012.
International Preliminary Report on Patentability and Written Opinion for PCT/EP2004/014605; Date of Issue Aug. 29, 2006.
International Preliminary Report on Patentability and Written Opinion for PCT/EP2010/001779; Date of Issuance Sep. 27, 2011.
International Preliminary Report on Patentability and Written Opinion for PCT/IB2010/002258; Date of Issuance Feb. 21, 2012.
International Preliminary Report on Patentability for International Application Serial No. PCT/EP2011/003261. International filing date Jul. 1, 2011. Date of Issuance Jan. 29, 2013.
International Preliminary Report on Patentability for International Application Serial No. PCT/EP2011/003262. International filing date Jul. 1, 2011. Date of Issuance Jan. 29, 2013.
International Preliminary Report on Patentability for International Application Serial No. PCT/EP2011/003263. International filing Jul. 1, 2011. Date of Issuance Jan. 29, 2013.
International Preliminary Report on Patentability for International Application Serial No. PCT/EP2011/003264. International filing date Jul. 1, 2011. Date of Issuance Jan. 29, 2013.
International Preliminary Report on Patentability and Written Opinion for PCT/EP2010/006866; Date of Issuance May 22, 2012.
International Preliminary Report on Patentability and Written Opinion for PCT/EP2010/006867; Date of Issuance May 22, 2012.
iQsun Laserscanner Brochure, 2 Pages, Apr. 2005.
International Preliminary Report on Patentability and Written Opinion for PCT/EP2009/050888; Date of Issuance Sep. 7, 2010.
International Preliminary Report on Patentability and Written Opinion for PCT/EP2010/001780; Date of Issuance Sep. 27, 2011.
International Preliminary Report on Patentability and Written Opinion for PCT/EP2010/001781; Date of Issuance Sep. 27, 2011.
International Preliminary Report on Patentability and Written Opinion for PCT/EP2010/006868; Date of Issuance May 22, 2012.
International Preliminary Report on Patentability and Written Opinion for PCT/EP2009/009174; Date of Issuance Aug. 16, 2011.
International Search Report and Written Opinion for PCT/EP2009/009174; Date of Mailing May 25, 2010.
International Search Report of the International Searching Authority for PCT/IB2010/002216; Date of Mailing Feb. 3, 2011.
International Search Report of the International Searching Authority for PCT/EP2007/005789; Date of Mailing Oct. 30, 2007.
International Search Report of the International Searching Authority for PCT/IB2010/002226; Date of Mailing Dec. 13, 2010.
International Search Report of the International Searching Authority for PCT/EP2004/014605; Date of Mailing Apr. 15, 2005.
International Search Report of the International Searching Authority for PCT/EP2006/003010; Date of Mailing Nov. 12, 2006.
International Search Report of the International Searching Authority for PCT/EP2010/001779; Date of Mailing Jul. 20, 2010.
International Search Report of the International Searching Authority for PCT/EP2010/001780; Date of Mailing Jul. 23, 2010.
International Search Report of the International Searching Authority for PCT/EP2010/001781; Date of Mailing Jul. 22, 2010.

(56) References Cited

OTHER PUBLICATIONS

International Search Report of the International Searching Authority for Application No. PCT/EP2011/001662; Date of Mailing May 26, 2011.
International Search Report of the International Searching Authority for PCT/IB2010/002258; Date of Mailing Jan. 28, 2011.
International Search Report of the International Searching Authority for Application No. PCT/EP2011/003261; Date of Mailing Oct. 17, 2011.
International Search Report of the International Searching Authority for Application No. PCT/EP2011/003263; Date of Mailing Oct. 19, 2011.
International Search Report of the International Searching Authority for PCT/EP2010/006867; Date of Mailing Mar. 18, 2011.
GB Examination Report dated Oct. 7, 2013 for GB Application No. GB1303390.7.
GB Examination Report dated May 20, 2014 for GB Application No. GB1220971.4.
First Chinese Office Action for Chinese Patent Applicaiton No. 2013082200801190; Dated Aug. 27, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.
Second Office Action with English Translation for Chinese Patent Application No. 201080003466.7; Issue Date Jul. 19, 2013.
German Office Action for DE Application Serial No. 102012109481.0; dated Aug. 1, 2013.
Japanese Office Action for JP Application Serial No. 2013-520990; Date of Mailing Jul. 2, 2013.
GB Examination Report dated Jun. 19, 2013 for GB Application No. GB1202398.2.
GB Examination Report dated Aug. 15, 2013 for GB Application No. GB 1303382.4.
GB Examination Report dated Aug. 7, 2013 for GB Application No. GB1303390.7.
Japanese Office Action for JP Application No. 2012-534589; issued Jul. 30, 2013.
Japanese Office Action for Application Serial No. 2013-520987; Date of Mailing Jul. 2, 2013.
Japanese Office Action for Application Serial No. 2013-520989; Date of Mailing Jul. 2, 2013.
Japanese Office Action for Application Serial No. 2012-534590; Date of Mailing Jul. 30, 2013.
Japanese Office Action for JP Application Serial No. 2012-501175; Date of Mailing Jul. 16, 2013.

\* cited by examiner

THREE-DIMENSIONAL SCANNER WITH ENHANCED SPECTROSCOPIC ENERGY DETECTOR

CROSS REFERENCE TO RELATED APPLICATIONS

The present application claims the benefit of U.S. Non-Provisional patent application Ser. No. 14/257,216, filed on Apr. 21, 2014, which is a continuation-in-part of U.S. Non-Provisional patent application Ser. No. 13/510,020, filed on Jun. 15, 2012, which is a National Stage Application of PCT Patent Application No. PCT/EP2010/006867, filed on Nov. 11, 2010, which claims the benefit of U.S. Provisional Patent Application No. 61/299,166, filed on Jan. 28, 2010, and of German Patent Application No. DE 10 2009 055988.4, filed on Nov. 20, 2009, all of which are hereby incorporated herein by reference. The present application also claims the benefit of U.S. Non-Provisional patent application Ser. No. 14/257,214, filed on Apr. 21, 2014, which is a continuation-in-part of the aforementioned U.S. Non-Provisional patent application Ser. No. 13/510,020, all of which are hereby incorporated herein by reference.

BACKGROUND OF THE INVENTION

The invention relates to a device for optically scanning and measuring an environment.

By a device such as is known for example from U.S. Published Patent Application No. 2010/0134596, and which comprises a laser scanner, the environment of the laser scanner can be optically scanned and measured. A rotary mirror which rotates and which comprises a polished plate of a metallic rotor, deflects both an emission light beam and a reception light beam. A collimator of a light emitter is seated in the center of a receiver lens. The receiver lens reproduces the reception light beam on a light receiver which is arranged on an optical axis behind the receiver lens. For gaining additional information, a line scan camera, which takes RGB signals, is mounted on the laser scanner, so that the measuring points of the scan can be completed by color information.

SUMMARY OF THE INVENTION

Embodiments of the present invention are based on the object of creating an alternative to the device of the type mentioned hereinabove.

A laser scanner for optically scanning and measuring an environment, the laser scanner comprising: a light emitter configured to emit an emission light, an electromagnetic energy generator configured to emit a first electromagnetic energy, and a first beam splitter configured to combine the emission light with the first electromagnetic energy in a combined light and to send the combined light out of the laser scanner into the environment; an optical system configured to receive as combined reflected light the combined light reflected by the environment; a second beam splitter configured to separate the combined reflected light into a reflected emission light and a reflected electromagnetic energy; an optical receiver configured to determine a distance to a point on an object in the environment based at least in part on the reflected emission light; a spectrometer receiver configured to determine a wavelength spectrum of the reflected electromagnetic energy based at least in part on the reflected electromagnetic energy; and a control and evaluation unit configured to link the determined distance to the wavelength spectrum.

BRIEF DESCRIPTION OF THE DRAWINGS

The invention is explained in more detail below on the basis of an exemplary embodiment illustrated in the drawing, in which.

DETAILED DESCRIPTION OF THE INVENTION

Figure 1:
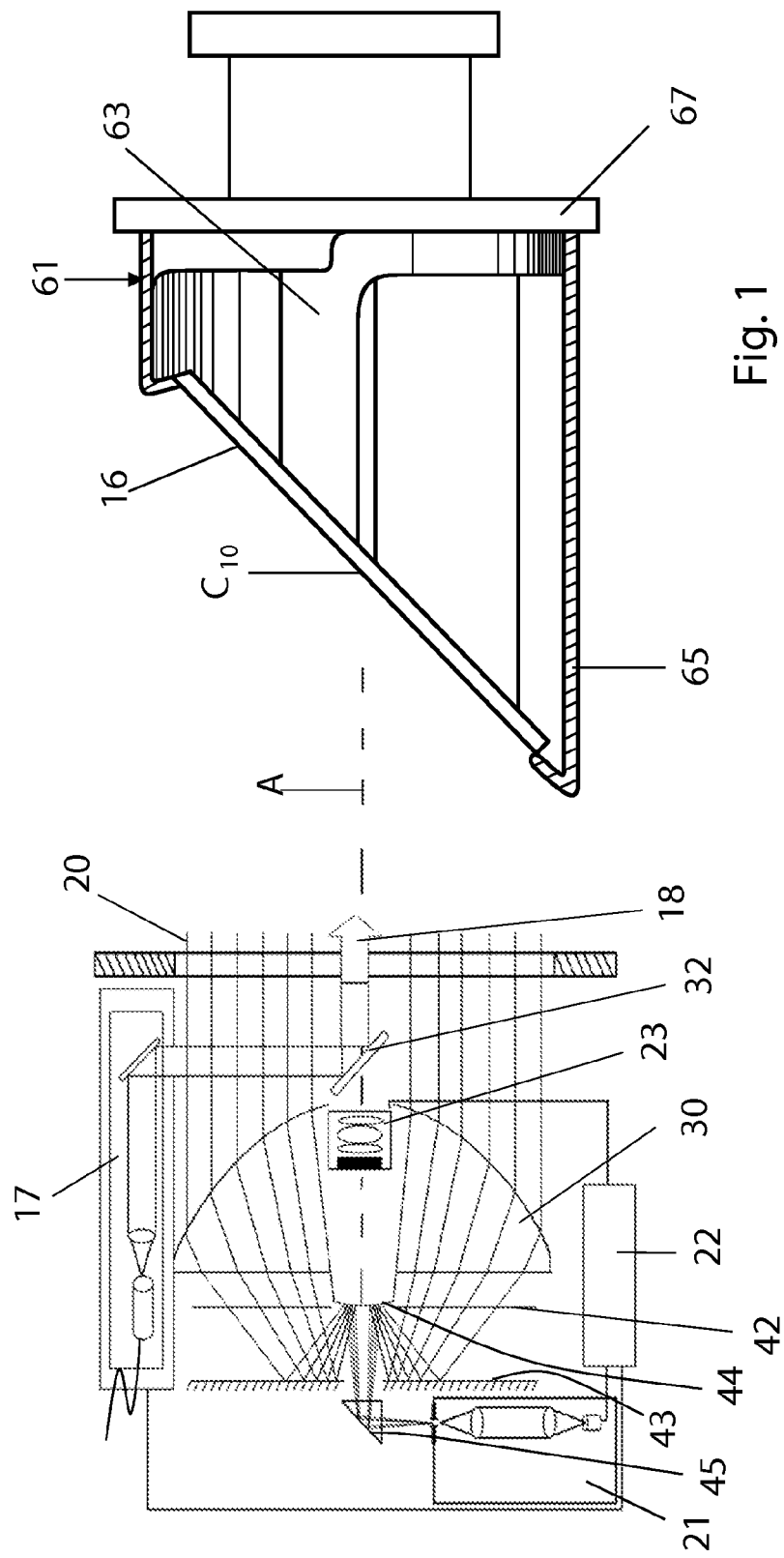
FIG. 1 is a partial sectional view of the laser scanner according to an embodiment.
Figure 2:
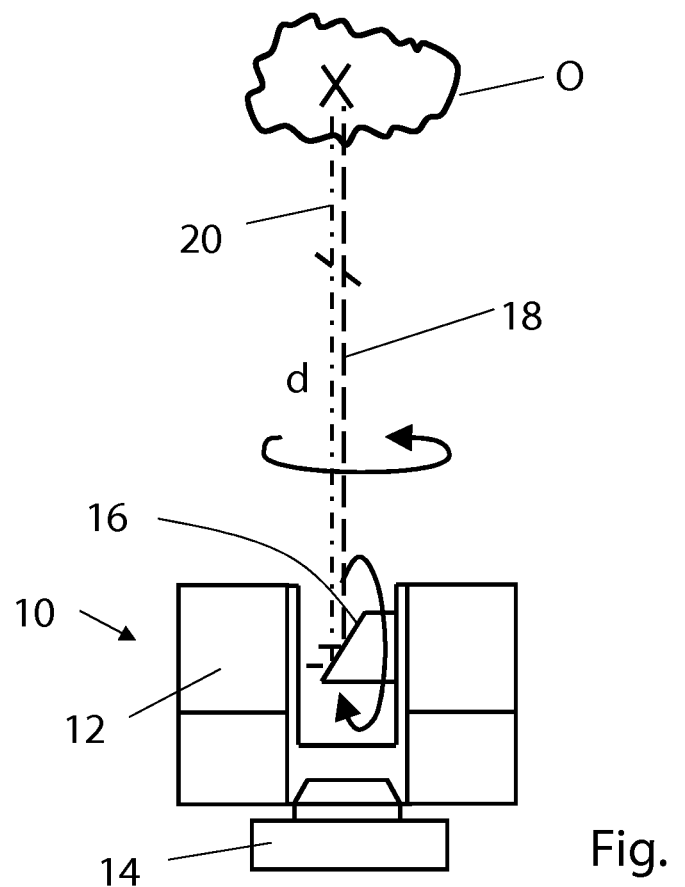
FIG. 2 is a schematic illustration of the laser scanner according to an embodiment.

Referring to FIGS. 1 and 2, a laser scanner 10 is provided as a device for optically scanning and measuring the environment of the laser scanner 10. The laser scanner 10 has a measuring head 12 and a base 14. The measuring head 12 is mounted on the base 14 as a unit that can be rotated about a vertical axis. The measuring head 12 has a rotary mirror 16, which can be rotated about a horizontal axis. The intersection point of the two rotational axes is designated center $C_{10}$ of the laser scanner 10.

The measuring head 12 is further provided with a light emitter 17 for emitting an emission light beam 18. The emission light beam 18 may be a laser beam in the range of approximately 340 to 1600 nanometers (nm) wavelength; for example 790 nm, 905 nm or less than 400 nm. Also other electromagnetic waves having, for example, a greater wavelength can be used. The emission light beam 18 is amplitude-modulated, for example with a sinusoidal or with a rectangular-waveform modulation signal. The emission light beam 18 is emitted by the light emitter 17 onto the rotary mirror 16, where it is deflected and emitted to the environment. A reception light beam 20 which is reflected in the environment by an object O or scattered otherwise, is captured again by the rotary mirror 16, deflected and directed onto a light receiver 21. The direction of the emission light beam 18 and of the reception light beam 20 results from the angular positions of the rotary mirror 16 and the measuring head 12, which depend on the positions of their corresponding rotary drives which, in turn, are registered by one encoder each.

A control and evaluation unit 22 has a data connection to the light emitter 17 and to the light receiver 21 in the measuring head 12, whereby parts of the unit 22 can be arranged also outside the measuring head 12, for example a computer connected to the base 14. The control and evaluation unit 22 determines, for a multitude of measuring points X, the distance d between the laser scanner 10 and the illuminated point at object O, from the propagation time of the emission light beam 18 and the reception light beam 20. For this purpose, the phase shift between the two light beams 18 and 20 is determined and evaluated.

Scanning takes place along a circle by means of the relatively quick rotation of the mirror 16. By virtue of the relatively slow rotation of the measuring head 12 relative to the base 14, the whole space is scanned step by step, by the circles. The entity of measuring points X of such a measurement is designated as a scan. For such a scan, the center $C_{10}$ of the laser scanner 10 defines the origin of the local stationary reference system. The base 14 rests in this local stationary reference system.

In addition to the distance d to the center $C_{10}$ of the laser scanner 10, each measuring point X comprises brightness information which is determined by the control and evaluation unit 22 as well. The brightness value is a gray-tone value which is determined, for example, by integration of the bandpass-filtered and amplified signal of the light receiver 21 over a measuring period which is attributed to the measuring point X. For certain applications it is desirable to have color information in addition to the gray-tone value. The laser scanner 10 is therefore also provided with a color camera 23 which is connected to the control and evaluation unit 22 as well. The color camera 23 may comprise, for example, a CCD camera or a CMOS camera and provides a signal which is three-dimensional in the color space, for example an RGB signal, for a two-dimensional picture in the real space. The control and evaluation unit 22 links the scan, which is three-dimensional in real space, of the laser scanner 10 with the colored pictures of the color camera 23, which are two-dimensional in real space, such process being designated "mapping." Linking takes place picture by picture for any of the colored pictures which have been taken to give as a final result a color in RGB shares to each of the measuring points X of the scan, i.e., to color the scan.

In the following, the measuring head 12 is described in detail.

The reception light beam 20 which is reflected by the rotary mirror 16 hits on a plano-convex, spherical receiver lens 30 which, in embodiments of the present invention, has an approximate semi-spherical shape. The optical axis A of the receiver lens 30 is orientated towards the center $C_{10}$ of the laser scanner. The convex side of the highly-refractive receiver lens 30 is orientated towards the rotary mirror 16. The color camera 23 is arranged on the same side of the rotary mirror 16 as the receiver lens 30 and on its optical axis A. In embodiments of the present invention, the color camera 23 is arranged on the point of the receiver lens 30 which is closest to the rotary mirror 16. The color camera 23 may be fixed on the untreated surface of the receiver lens 30, for example, be glued on it, or be placed in an appropriate recess of the receiver lens 30.

In front of the color camera 23, i.e., closer to the rotary mirror 16, an emission mirror 32 is arranged, which is dichroic, i.e., in embodiments of the present invention the mirror 32 transmits visible light and reflects red laser light. The emission mirror 32 is consequently transparent for the color camera 23, i.e., the mirror 32 offers a clear view onto the rotary mirror 16. The emission mirror 32 is at an angle with the optical axis A of the receiver lens 30, so that the light emitter 17 can be arranged at the side of the receiver lens 30. The light emitter 17, which comprises a laser diode and a collimator, emits the emission light beam 18 onto the emission mirror 32, from where the emission light beam 18 is then projected onto the rotary mirror 16. For taking the colored pictures, the rotary mirror 16 rotates relatively slowly and step by step. However, for taking the scan, the rotary mirror 16 rotates relatively quickly (e.g., 100 cps) and continuously.

Due to the arrangement of the color camera 23 on the optical axis A of the receiver lens 30, there is virtually no parallax between the scan and the colored pictures. Since, in known laser scanners, the light emitter 17 and its connection is arranged instead of the color camera 23 and its connection, for example a flexible printed circuit board, the shadowing effects of the receiver lens 30, due to the color camera 23 and to the emission mirror 32 do not change or change only insignificantly.

To also register remote measuring points X with a relatively large focal length on the one hand and, on the other hand, to require relatively little space, the laser scanner 10 has "folded optics." For this purpose, a mask 42 is arranged on the optical axis A behind the receiver lens 30, where the mask is orientated coaxially to the optical axis A. The mask 42 is arranged radially inward (i.e., as referred to the optical axis A) and has a relatively large free area to let the reception light beam 20, which is reflected by the remote objects O, pass unimpeded, while the mask 42, arranged radially outward, has relatively smaller shaded regions to reduce intensity of the reception light beam 20 which is reflected by nearby objects O, so that comparable intensities are available.

A rear mirror 43 is arranged on the optical axis A behind the mask 42, where the mirror is planar and perpendicular to the optical axis A. The rear mirror 43 reflects the reception light beam 20, which is refracted by the receiver lens 30 and which hits on the central mirror 44. The central mirror 44 is arranged in the center of the mask 42 on the optical axis A, which is shadowed by the color camera 23 and the emission mirror 32. The central mirror 44 is an aspherical mirror which acts as both a negative lens, i.e., increases the focal length, and as a near-field-correction lens, i.e., shifts the focus of the reception light beam 20 which is reflected by the nearby objects O. Additionally, a reflection is provided only by such part of the reception light beam 20, which passes the mask 42 which is arranged on the central mirror 44. The central mirror 44 reflects the reception light beam 20 which hits through a central orifice at the rear of the rear mirror 43.

The light receiver 21, which comprises an entrance diaphragm, a collimator with a filter, a collecting lens and a detector, is arranged at the rear of the rear mirror 43. To save space, a reception mirror 45 may be provided, which deflects the reception light beam 20 by 90°, so that the light receiver 21 can be arranged radial to the optical axis A. With the folded optics, the focal length can be approximately doubled with respect to known laser scanners.

Figure 3:
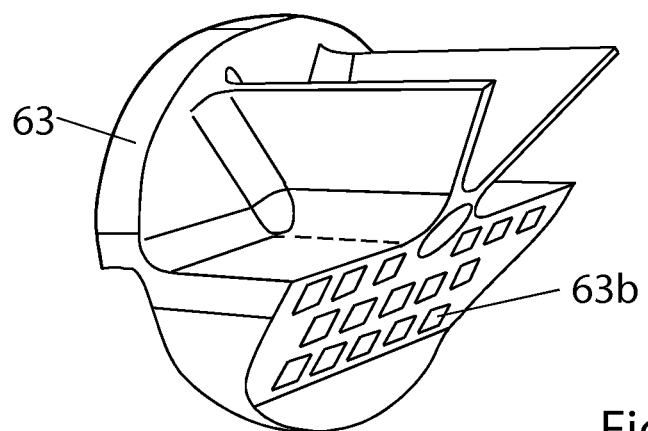
FIG. 3 is a perspective illustration of the rotor holder.

Referring also to FIG. 3, the rotary mirror 16 as a two-dimensional structure is part of a rotor 61 which can be turned as a three-dimensional structure by the corresponding rotary drive, and the angle position of the drive is measured by the assigned encoder. To save space also with respect to the rotary mirror 16 due to a relatively short design of the rotor 61 and to keep the rotor 61 balanced, the rotor 61 is designed as hybrid structure, comprising a holder 63, the rotary mirror 16 which is mounted at the holder 63 and a housing 65 made of plastic material, where the housing additionally holds the rotary mirror 16.

The metallic holder 63 has a cylindrical basic shape with a 45° surface and various recesses. Portions of material, for example blades, shoulders and projections, each of which serves for balancing the rotor 61, remain between theses recesses. A central bore serves for mounting the motor shaft of the assigned rotary drive. The rotary mirror 16 is made of glass, which is coated and reflects within the relevant wavelength range. The rotary mirror 16 is fixed at the 45° surface of the holder 63 by glue, for which purpose special attachment surfaces 63b are provided at the holder 63.

The housing 65 made of plastic material has the shape of a hollow cylinder which has been cut below 45° and encloses at least the holder 63. The housing 65 can be glued to the rotary mirror 16 or be fixed otherwise. The housing 65 can clasp the rotary mirror 16 at its periphery, for example in a form-locking manner, if necessary with the interposition of a rubber sealing or the like. The housing 65 can also be glued to the holder 63 or be otherwise fixed to the holder 63 directly, or, by the mounting of the rotor 61, the housing 65 can be connected to the holder 63, for example screwed to it, by an end plate 67. The glue used on the one hand offsets the different temperature coefficients of expansion of the materials used and, on the other hand, leaves the dynamic behavior unaffected, for example shows an elasticity which is not relatively too large, to avoid speed-dependent unbalances.

The rotor 61 rotates about the optical axis A. The rotary mirror 16 covers the holder 63 on one of its faces (namely on the 45° surface). The housing 65 covers the holder 63 radially outside with respect to the optical axis A. Thus, sharp edges of the holders 63 are covered to prevent injuries. The holder 63 is balancing the rotor 61. Instead of metal, the holder 63 may be made of another relatively heavy material, dominating the moment of inertia. Instead of plastic, the housing 65 may be made of another relatively light material, having few influences on the moment of inertia. Instead of coated glass, the rotary mirror 16 may be reflective (and transparent) otherwise. Designed as a hybrid structure, the rotary mirror 16, the holder 63, and the housing 65 are separately formed parts fixed together.

Figure 4:
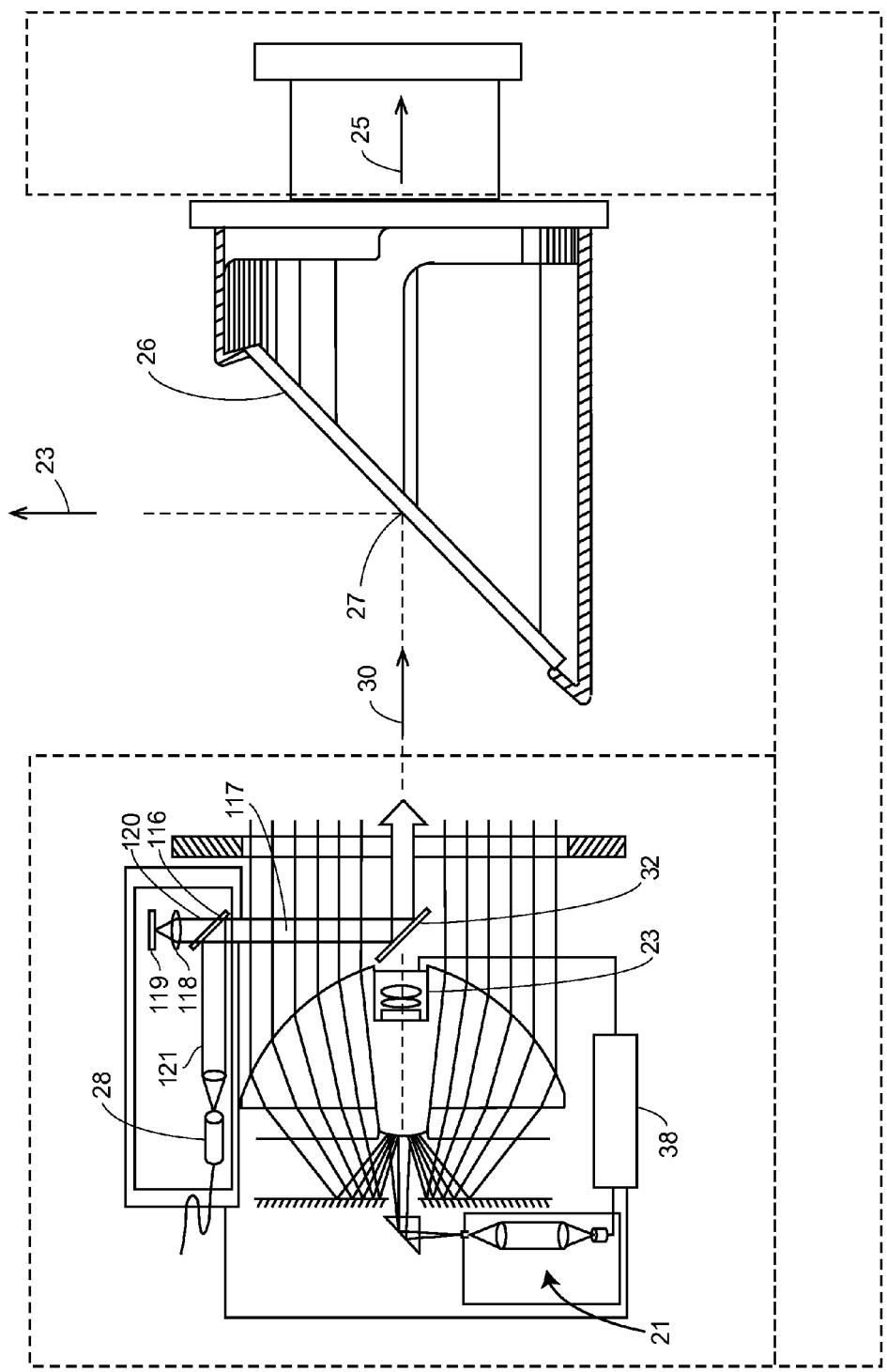
FIG. 4 is a partial sectional view of the laser scanner according to an embodiment.

FIG. 4 shows a partial sectional view of the laser scanner, the view substantially the same as that of FIG. 1 except for the presence of a dichroic beam splitter 116, optional lens 118, and energy detector 119. The dichroic beam splitter includes a coating that splits off some wavelengths of electromagnetic energy (i.e., light) to travel on a path 121 to the light receiver 21 and other wavelengths of electromagnetic energy to travel on a path 120 to the optional lens 118 and energy detector 119.

Examples of electromagnetic energy that might be detected by energy detector 119 include thermal energy, ultraviolet radiation, millimeter-wave radiation, and X-ray radiation. For an energy detector 119 that detects thermal energy, the electromagnetic radiation may be in the near-infrared or mid-infrared region of the electromagnetic spectrum.

In many cases, a lens 118 is placed between the dichroic beam splitter 116 and the energy detector 119. In some cases, the lens may focus the electromagnetic radiation in the path 120 onto a small spot on the energy detector 119. In this case, the energy detector is collecting the electromagnetic radiation at the same time distance information is being collected during the scanning procedure. In other words, in this instance, the detector is collecting the energy information on a point-by-point basis.

In other cases, the lens 118 may be placed so as to form an image of a region of the environment. In this case, the lens 118 includes multiple detector elements (i.e., pixels). For this type of detector, the scanner probably collects information with the scanner moved to discrete steps, where the step size is selected to match the field-of-view of the lens system.

Although the dichroic beam splitter is shown at a position occupied by a mirror in FIG. 1, it is possible to locate the dichroic beam splitter in a variety of other positions. For example, the dichroic beam splitter 116 may be located near the dichroic emission mirror 32 in order to gain a wider field-of-view than would be possible in the position shown in FIG. 4 for the dichroic beam splitter 116.

Figure 5:
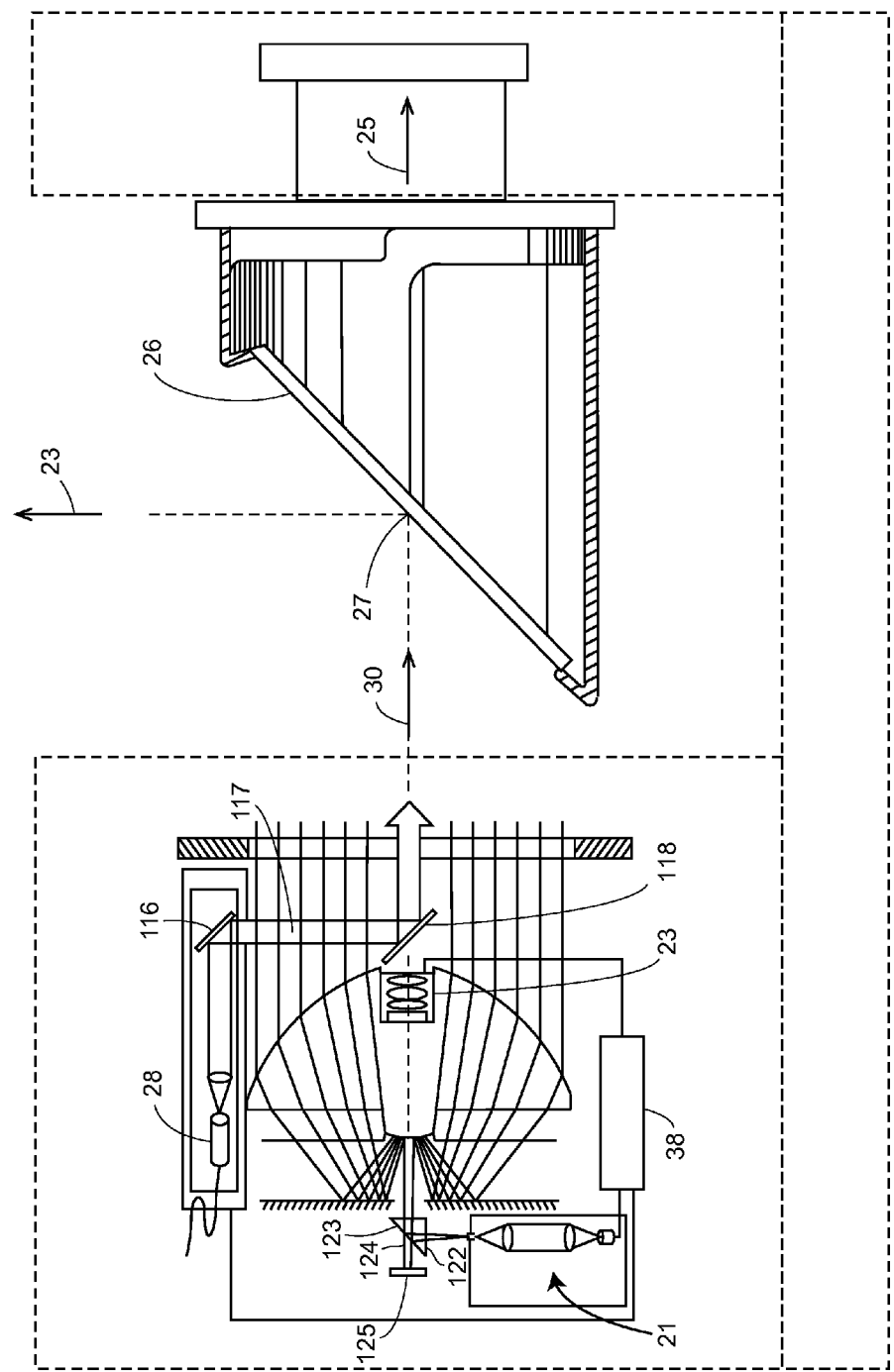
FIG. 5 is a partial sectional view of the laser scanner according to an embodiment.

It is also possible to change from a beam splitter by coating a right angle mirror to reflect one wavelength and transmit a second wavelength. FIG. 5 shows the right angle prism mirror 122 coated on a face 123 to reflect the wavelength of the light source 28 onto the light receiver 21. Electromagnetic energy of a different wavelength is transmitted through the prism 122 in a beam 124 to energy detector 125.

The use of multiple dichroic beam splitters such as elements 32 and 116 provide a way to obtain, in a single 3D scanner, information about a variety of emissions. For example, it may be important to know the 3D coordinates and color of objects in an environment and, in addition, know the temperature of those objects. A simple example might be a scan of the interior or exterior of a house showing the temperature of the different areas of the house. By identifying the source of thermal leakage, remedial action such as adding insulation or filling gaps, may be recommended.

Dichroic beam splitters may also be used to obtain multiple wavelengths to provide diagnostic chemical information, for example, by making the energy detector a spectroscopic energy detector. A spectroscopic energy detector, as defined here, is characterized by its ability to decompose an electromagnetic signal into its spectral components. In many cases, a beam of light is projected onto an object. The reflecting light may be received and analyzed to determine the spectral components that are present. Today, gratings and other elements being found in spectroscopic energy detectors are being miniaturized through the use of micro electromechanical chips. Several companies are working on miniature devices today capable of analyzing the nutritional components of food. For example, Fraunhofer has reported working on a spectrometer of only 9.5×5.3×0.5 mm for this purpose. An example of a device for which a scanner 10 may be particularly appropriate is one in which the spectral emissions may indicate the presence of explosives. Such a method is described in U.S. Pat. No. 7,368,292 to Riegl et al.

Figure 6:
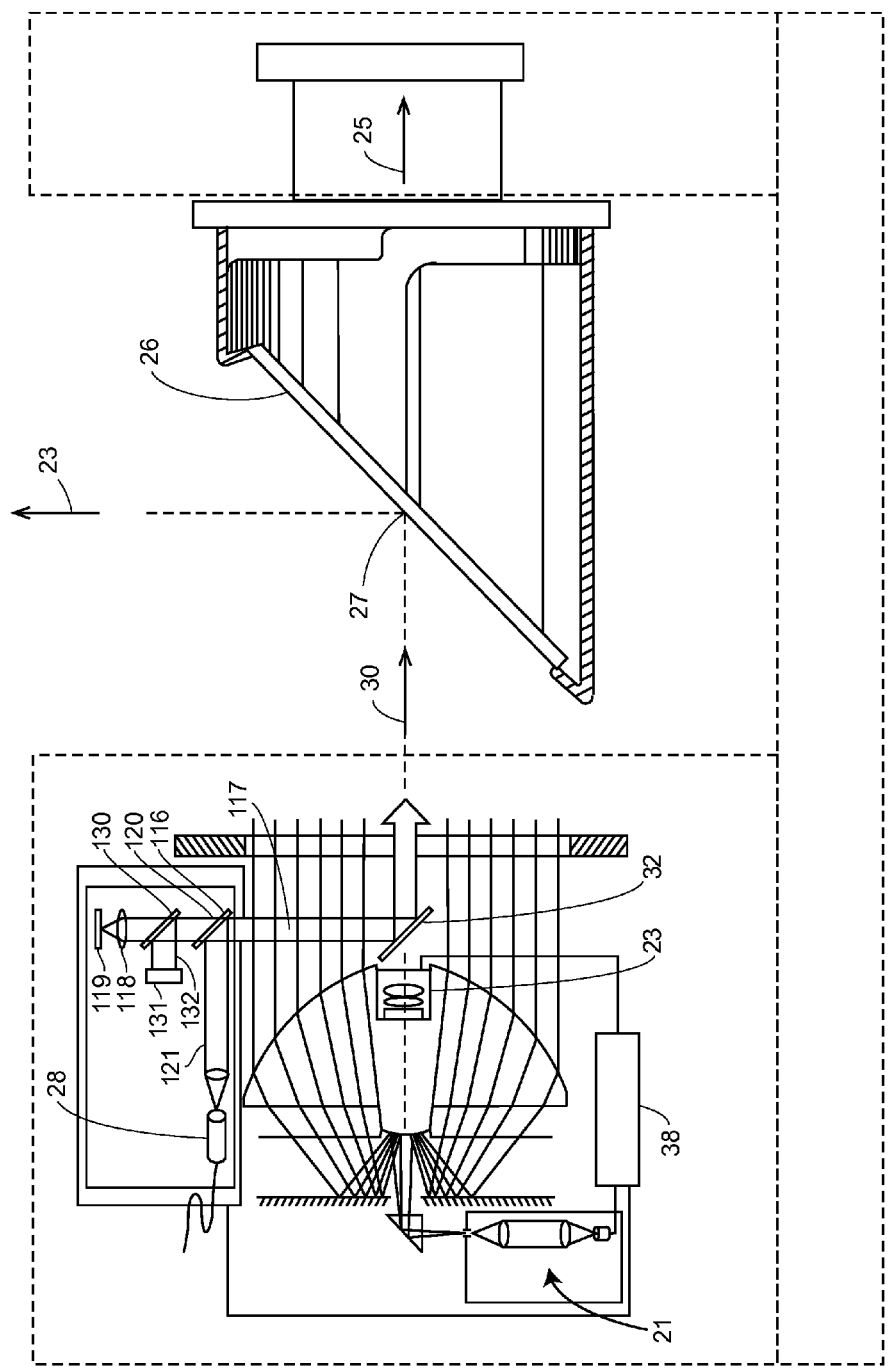
FIG. 6 is a partial sectional view of the laser scanner according to an embodiment.

FIG. 6 shows the elements of a spectroscopic system embedded within a scanner 10. A source of electromagnetic energy emits light that reflects off beam splitter 130. In one embodiment, beam splitter 130 is a non-polarizing beam splitter. In another embodiment, beam splitter 130 is a polarizing beam splitter, oriented in relation to the light source 131 so as to minimize losses. The energy detector 119 is a spectroscopic energy detector capable of determining the wavelengths of incident electromagnetic energy. The wavelengths of the reflected electromagnetic energy detected by the energy detector may, in some cases, be used to determine material properties of an object being scanned in the environment. In some embodiments, the electromagnetic energy source 131 and the beam splitter 130 are moved below the beam splitter 116 in FIG. 6.

Figure 7:
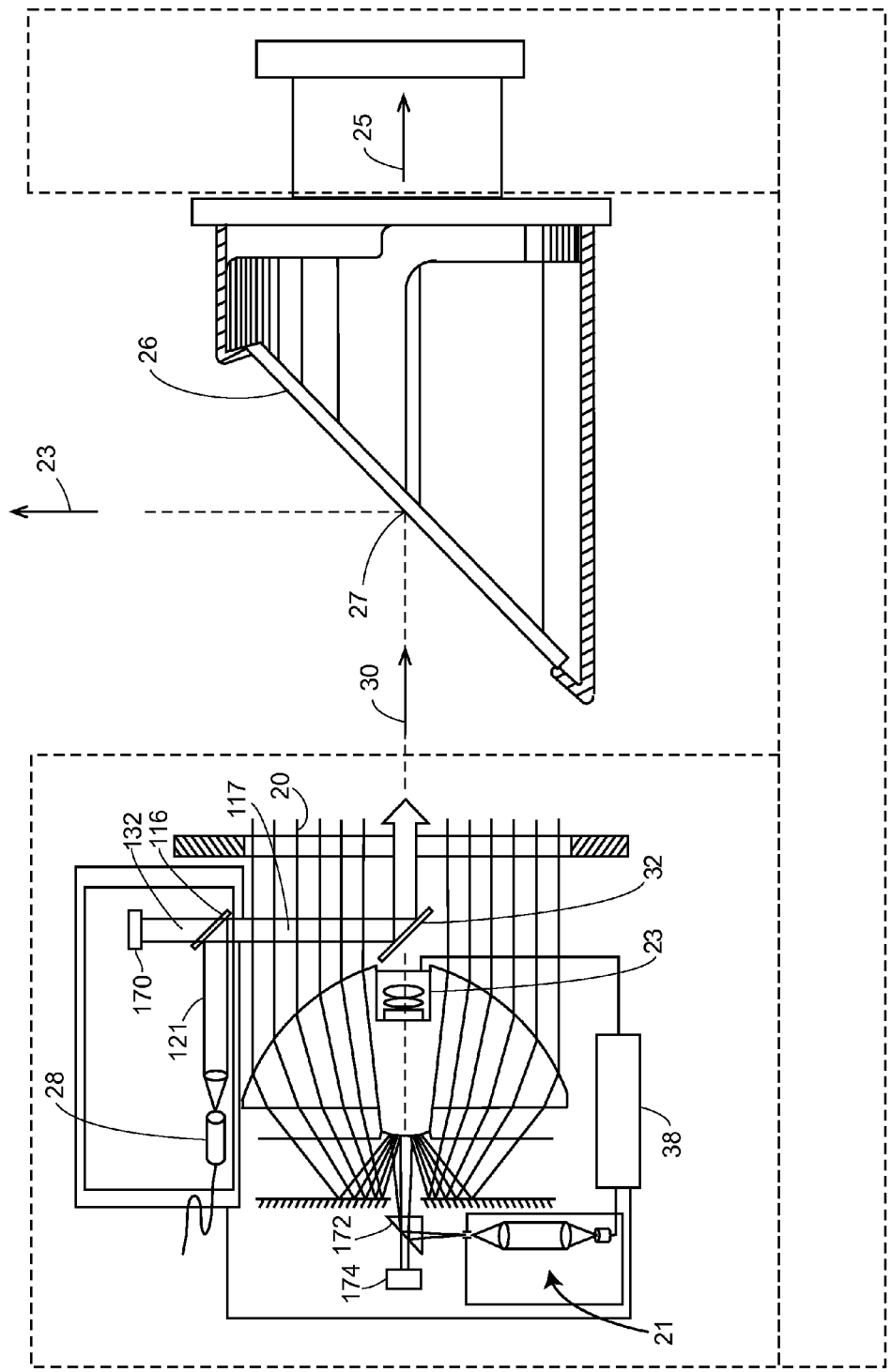
FIG. 7 is a partial sectional view of the laser scanner according to an embodiment.

In many cases, it is desirable to capture as much of scattered spectroscopic light as possible. This improves the ability to detect small signals and improves the signal-to-noise ratio of the captured signals. As shown in FIG. 7, a way to do this is to provide the signal from a spectroscopic light source 170 in a narrow beam by sending it through the beam splitter 116 to combine it with the light 121 provided for the distance meter. In an embodiment, this combined beam of light 117 is reflected off the dichroic beam splitter 32 and off the rotating mirror 27 before it strikes a point X on the object O as shown in FIG. 2. On the return path, the scattered light 20 includes the light for the distance meter as well as the scattered light provided by the spectrometer source 170.

In an embodiment, the combined light 20 passes through refractive and reflective optical elements as discussed herein above before arriving at a dichroic beam splitter 172. In an alternative embodiment, because light may be absorbed by glass optics, the optical components may be entirely reflective. The dichroic beam splitter is shown in FIG. 7 has a right angle prism beam splitter but any sort of geometry of beam splitter may be used. In the configuration of FIG. 7, light at the wavelength used by the distance meter (for example, 1550 nm) is reflected into the light receiver 21 while transmitted light passes into a spectrometer 174. In another embodiment, the order is reversed, with light reflected into the spectrometer and light transmitted into the light receiver 21. In still other embodiments, the different wavelengths of light are separated with a fiber-optic splitter or another type of splitter.

One useful application for a spectrometer source 170 and receiver 174 in FIG. 7 is to detect and identify contaminating or hazardous materials from a distance. Such detection of chemical substances from a distance is usually referred to as "standoff" detection. A TOF scanner that includes a spectroscopic light source 170 and receiver 174 is a useful tool for identifying hazardous materials and locating them in three dimensions.

There are two general ways in which spectroscopy may be used to identify materials. In one case, the direct absorption or transmission of the applied light is measured with the spectrometer. In an alternative case, light is measured at a different wavelength, usually at a longer wavelength, which is where light photons have less energy. One example of this latter case is photo-thermal infrared imaging spectroscopy (PT-IRIS). The wavelength of the emitted light is affected by a slight increase in temperature (typically one to two degrees Celsius) in such a way as to enable material identification in some cases. Another example of the latter case of measuring light at a different wavelength is that of Raman scattering. Many different types of Raman scattering measurements are possible.

In most cases, the absorption spectra of the illuminated materials are directly measured at the wavelengths of the applied light. Although there are many cases in which illumination ultraviolet (UV), near infrared (NIR), and Terahertz (THz) wavelengths are important for identifying materials, in many cases, determination of a chemical species is most accurately done by illuminating the sample at "fingerprint" region of infrared spectroscopy which range from $1/\lambda$ wave numbers of 1450 cm$^{-1}$ to 500 cm$^{-1}$, corresponding to about wavelengths of about 6.5 µm to 20 µm, respectively. Photons in this region of the spectrum excite the illuminated molecule to a higher state of vibration through stretching or bending. Such stretching and bending modes provide a sensitive way to distinguish similar molecular compounds.

Miniature chip-sized spectrometers are now being developed with greater sensitivity and capability at all wavelengths, but with special attention being given to wavelengths from 3 µm to 15 µm. One laser source that generates infrared light in the 3 to 14 micrometer wavelength range is the quantum cascade laser (QCL). This type of laser has the advantage of relatively high power—for example, peak pulsed powers of up to 200 mW and average powers of up to 10 mW. Such power levels provide a relatively good signal-to-noise ratio in spectroscopy measurements.

Figure 8:
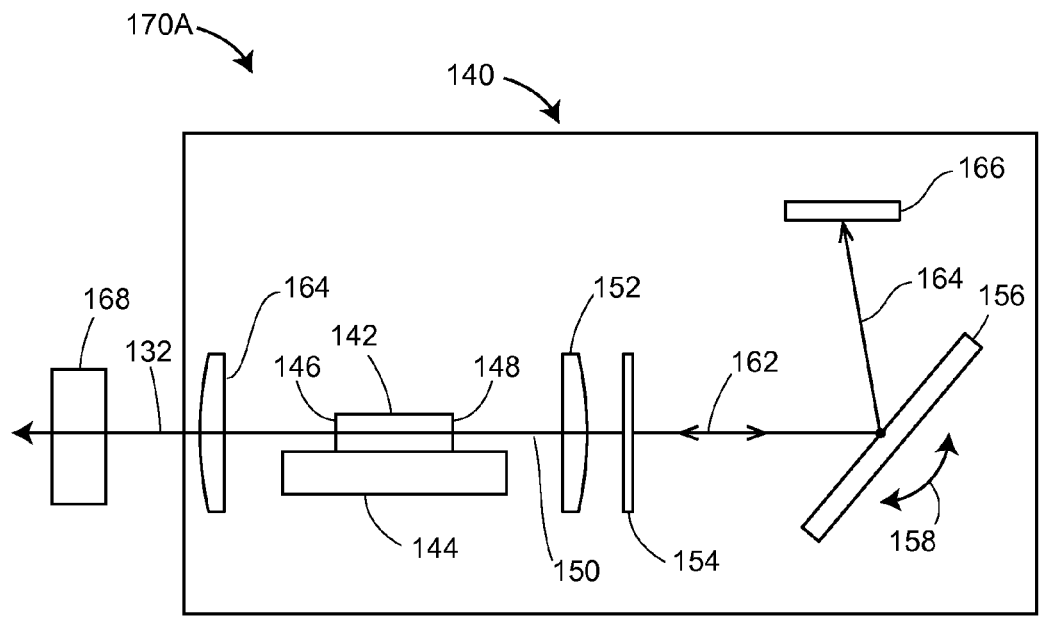
FIG. 8 is a schematic illustration of a swept laser in an external cavity configuration.

In a spectroscopy system for chemical detection, it is desirable that a wide range of infrared wavelengths be covered. One way to achieve wide wavelength coverage at infrared wavelengths is to make a miniature external cavity QCL laser 170A in FIG. 8, which corresponds to source 170 in FIG. 7. In FIG. 8, the light source 170A is an external cavity laser 140 that emits an output beam 132, as seen in FIG. 7. The external cavity laser 140 includes a QCL chip 142 attached to a submount that dissipates heat generated by the laser 142. The QCL laser chip 142 includes a rear facet and a front facet. In an embodiment, the rear facet 148 includes an antireflection coating to minimize facet reflections. The light emerging from the back facet 148 passes through a collimating lens 152, which is also coated to minimize optical reflections. Light passes through a linear polarizer 154 and strikes a grating 156. The grating includes periodic features. For any given angle of rotation of the grating, a properly blazed grating will diffract back in the $-1^{st}$ order a relatively large amount of the light along the path 162. The angle of the diffraction grating is adjusted by a microelectromechanical system (MEMS) 158. Another (relatively small) part of the light reflects off the grating 156 as a specular (zeroth order) beam 164 and is absorbed by the beam block 166. In an embodiment, the front facet is relatively reflective and transmits a relatively small percentage of the light in the cavity of the QCL chip 142 into the output beam 132. In an embodiment, the QCL laser source 170A further includes a speckle reducer 168, which reduces the coherence of the output light. In an embodiment, the speckle reduce 168 is a rotating plate, which might be for example a polycrystalline plate of transparent material. The purpose of reducing speckle is to increase the signal-to-noise ratio of the signal obtained by the spectroscopic receiver 174.

In another embodiment, several light sources are combined to form one equivalent light source 170 to cover a wider range of wavelengths. For example, several QCL lasers may be swept over different wavelength ranges and their outputs combined using dichroic beam splitters.

Figure 9:
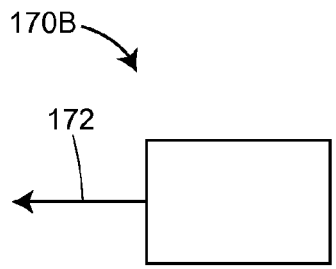
FIG. 9 is a schematic illustration of a broadband laser comb source.

In an alternative embodiment, the spectroscopic light source 170B in FIG. 9 includes a comb 172 of spectral lines covering a broad spectrum, for example, of an octave or more. Examples of light sources that may be used as a part of a comb generating light source 170B include a QCL, thulium laser, continuum laser source, or other broadband laser source. Such a frequency comb provides a way to accurately determine the wavelength of chemical species being analyzed spectroscopically. Work is underway around the world to develop chip-sized components to provide laser sources that incorporate frequency combs. Wavelengths from ultraviolet (UV) to Terahertz (THz) are under active investigation. For example, such efforts are underway in Europe in the Miracle, InSpectra, and Multicomb projects, and in the United States through the Spectral Combs from UV to THz (SCOUT) program.

Figure 10:
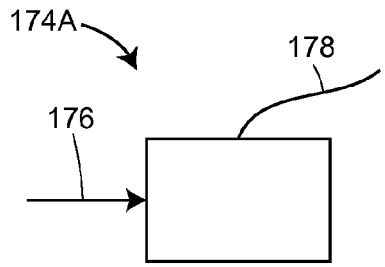
FIG. 10 is a schematic illustration of a spectrometer receiver that determines wavelength spectrum through correlation with wavelengths emitted by a swept laser source.

For the case in which the light source 170 is swept, as illustrated for example in FIG. 8, the detector 174 may be provided as a simple optical detector 174A illustrated in FIG. 10. In this optical detector an electrical timing signal 178 is provided to enable correlation of the received light signal 176 to the wavelength of light emitted by the light source 170.

For the case in which the light source is a single broadband light source, a spectroscopic detector needs the capability to determine and report wavelengths of the spectrometer light scattered off object points X in FIG. 2. The broadband frequency comb 170B is an example of such a broadband light source. Spectrometer receivers may be based on use of gratings, Fabry-Perot interferometers, Fourier transform methods, or other methods. A common type of spectrometer receiver for visible and near infrared spectra are based on gratings, some examples of which are shown in FIGS. 11A-D. Spectrometer receiver 174B in FIG. 11A includes a slit 202, a concave mirror 210, a curved diffraction grating 212, and a linear photosensitive array 220. Light is focused to a line and passes through the slit 202 and spreads into the rays 204, 206, and 208, which are reflected off the concave mirror 210 and are reflected to the curved diffraction grating 212. The diffraction grating separates the rays of light into component spectral components that intercept the concave mirror in separated spectral components 212A-212B, 214A-214B, and 216A-216B. In reaching the linear photosensitive array 220, the spectral components for the separate rays have converged to points on the array including the points 218A and 218B. In an embodiment, the light rays 204, 206, and 208 are in the visible spectrum and the spectral components 218A and 218B correspond to the colors red and violet, respectively.

Figure 11A:
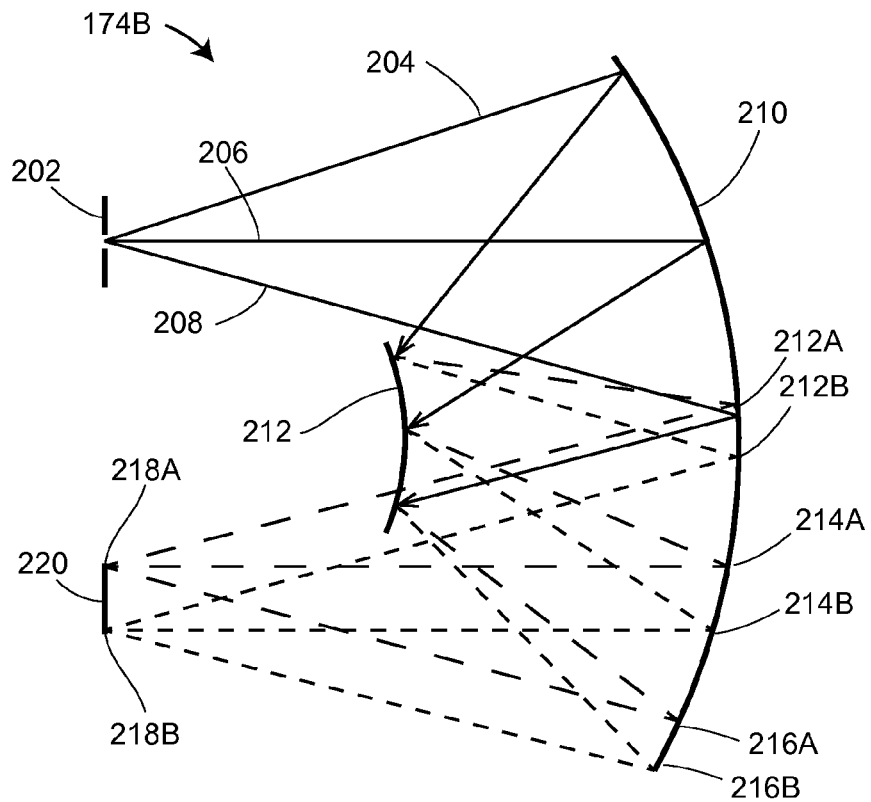
FIGS. 11A, 11B, 11C, and 11D are schematic representations of exemplary grating spectrometers.
Figure 11B:
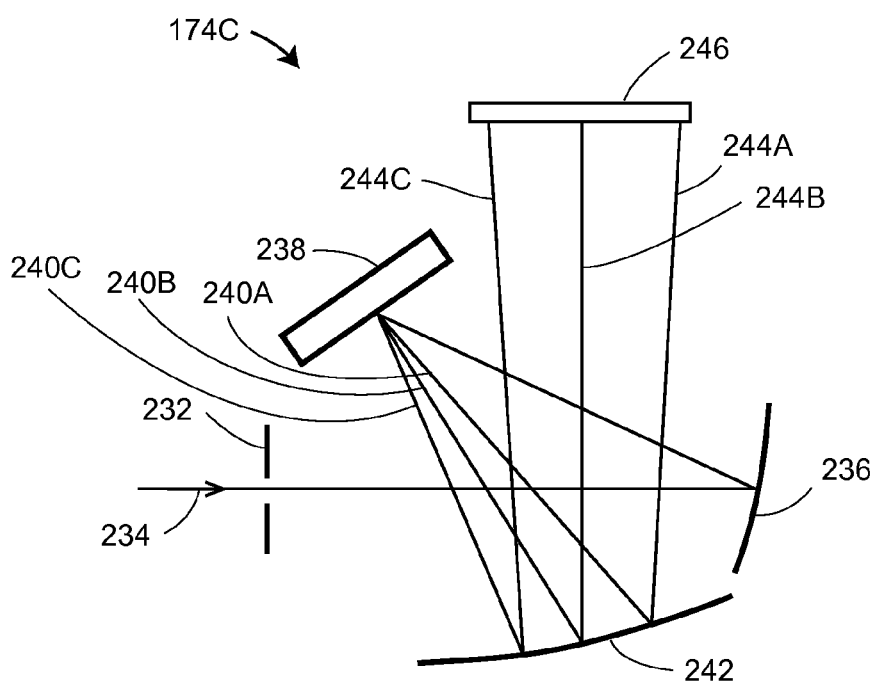

Spectrometer receiver 174C in FIG. 11B includes a slit 232, curved mirrors 236 and 2442, diffraction grating 238, and linear photosensitive array 246. A beam of light passes through the slit 232, travels to the first mirror 236 and reflects onto the grating 238. The grating separates the light into spectral components 240A, 240B, and 240C, which reflect off the curved mirror 242 and travel to linear photosensitive arrays 246 as the rays 244A, 244B, and 244C, respectively.

Figure 11C:
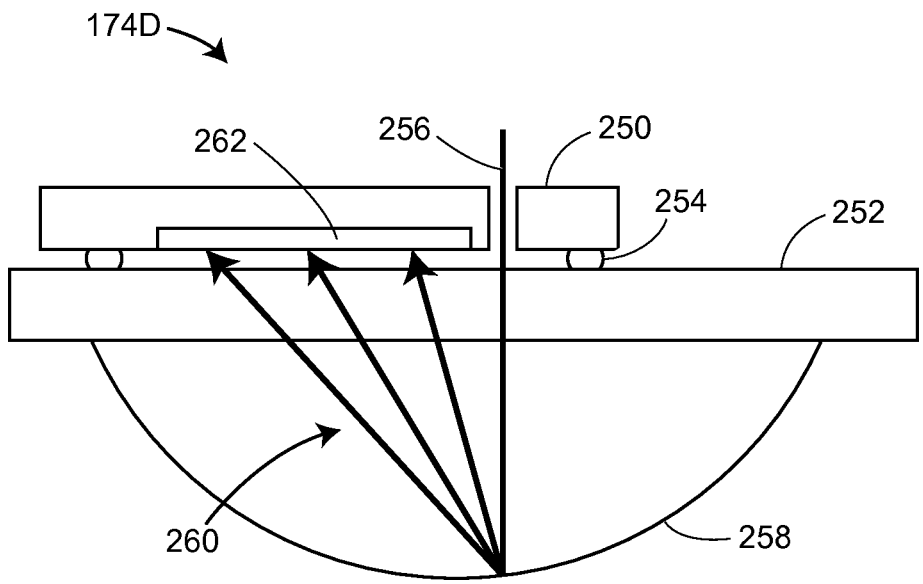
Figure 11D:
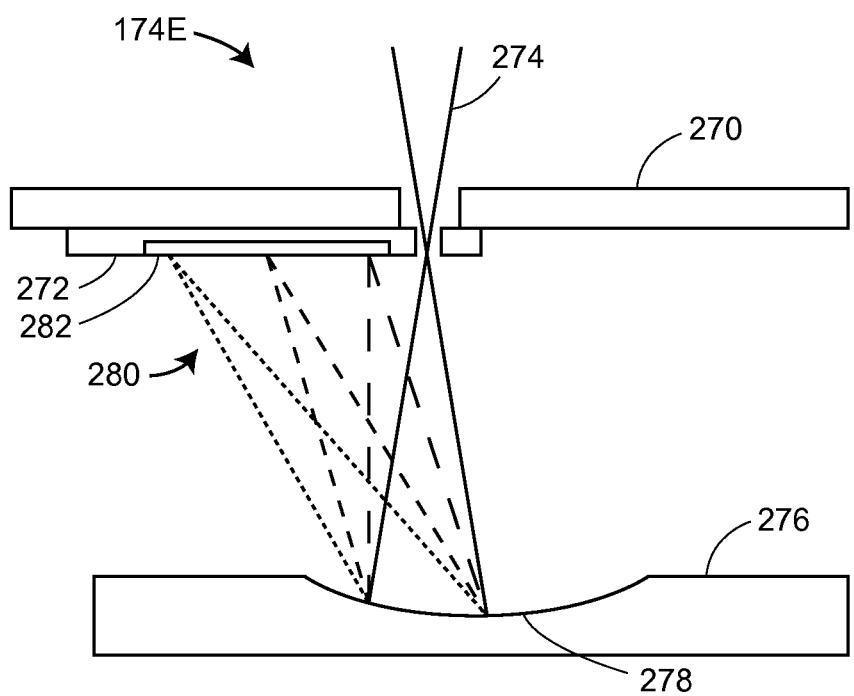

Miniature spectrometer receivers are shown in FIGS. 11C and 11D. Spectrometer receiver 174D includes a receiver chip 250, an electrical substrate 252, electrical contacts 254, a concave grating, and a linear photosensitive array within the receiver chip 250. Light 256 passes through an aperture in the receiver chip 250, travels to the concave grating, from different spectral components are separated and detected electrically by the linear photosensitive array 262. Spectrometer receiver 174E includes an upper substrate 274, a receiver chip 272 that includes a linear photosensitive array 282, and a lower substrate 276 that includes a concave grating 278. Light passes through an aperture in the upper substrate 270 and receiver chip 272, and strikes the concave grating 278, which separates different spectral components that are detected electrically by the linear photosensitive array 282.

The grating spectrometer receivers illustrated in FIGS. 11A-D are mostly available at visible and near infrared spectral regions. For measurements at longer wavelengths such as in the fingerprint region, such spectrometer receivers are not commonly available. Instead, for broadband light sources such as frequency comb of FIG. 9, a Fourier transform spectrometer receiver is more often used. A first example of a Fourier transform spectrometer receiver 290 is shown in FIG. 12A. The spectrometer receiver 274F includes a light input 292 to a fiber-optic connector 294, which routes light through an optical fiber 296 to a MEMS interferometer chip 298. In an embodiment, the MEMS interferometer is a monolithic Michelson interferometer, but other types of interferometers such as a Mach-Zehnder interferometer may equally well be used. The interferometer output is sent through an optical fiber 302 to an optical detector that produces an electrical output that is sent to a processor 306. The MEMS device 298 is includes an adjustable mirror configured to step through a series of steps to produce different electrical interference patterns recorded by the optical detector 304. These electrical patterns are evaluated by the processor 306 to determine the frequency spectrum of the incoming light 292.

Figure 12B:
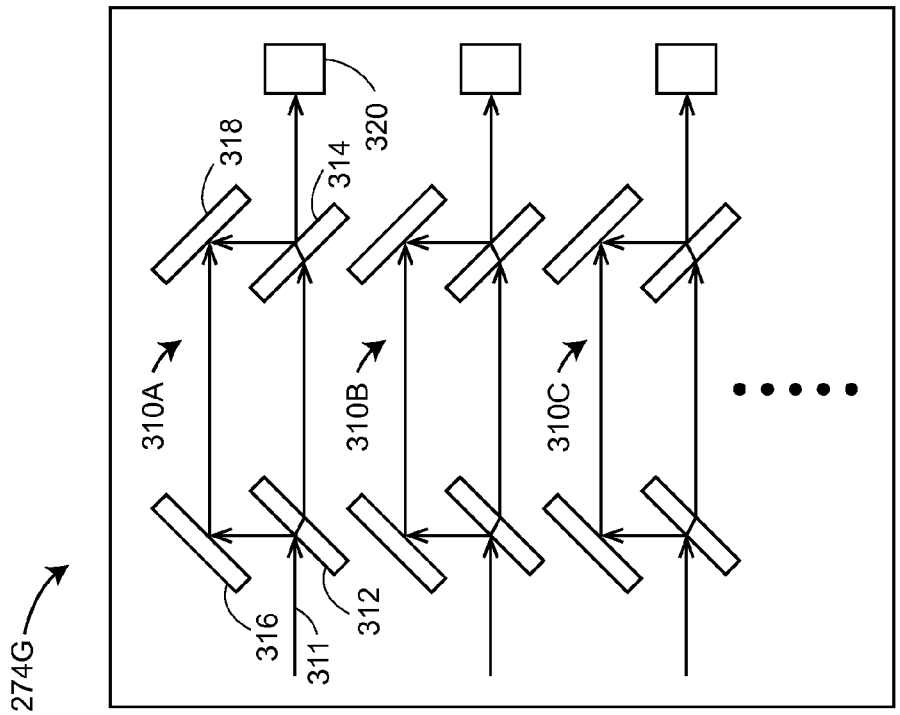
FIGS. 12A and 12B are schematic representations of exemplary Fourier transform spectrometers.
Figure 12A:
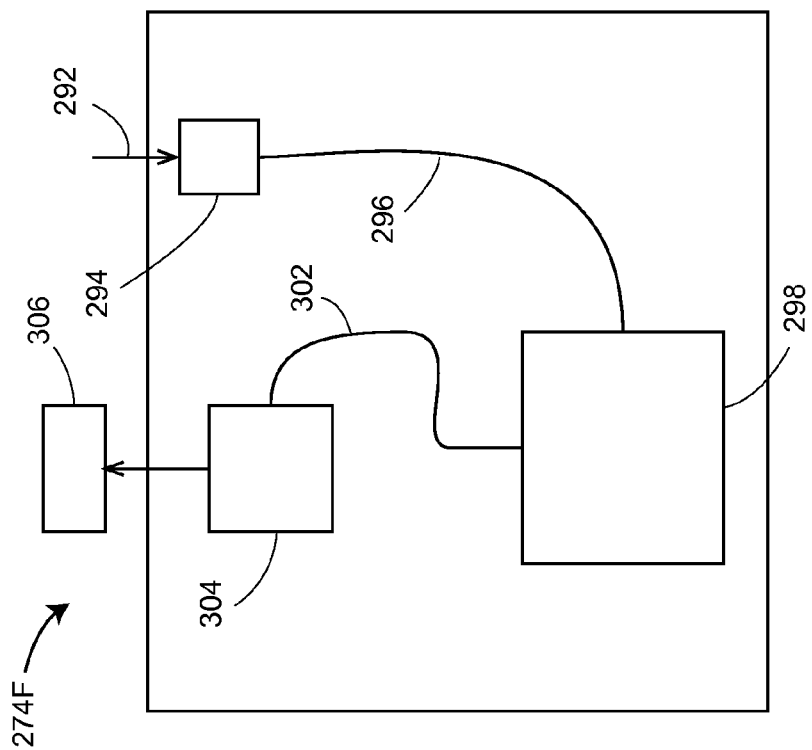

Another type of Fourier transform spectrometer receiver 274G in FIG. 12B has been implemented in a compact, low-cost version for cell phones for use in the visible spectrum. This spectrometer receiver includes a collection of Mach-Zehnder interferometers that send light along two paths to obtain an interference pattern at an output. In the embodiment of FIG. 274G, light received by a cell phone is routed to channels of a Mach-Zehnder interferometer, the channels indicated as 310A, 310B, 310C, and so forth. Each channel includes beam splitters 312, 314 and mirrors 316, 318. Each channel receives light 311, which is routed along the two interferometer paths. Each of the channels has a slightly different interferometer path length difference, which produces a slightly different interference signal for each channel. This optical signal output from the beam splitter 314 passes to a pixel 320 on the photosensitive array, which converts it to an electrical signal analyzed by a processor in the system to determine the frequency spectrum of the received light.

For the case in which the received light includes a very large number of frequency comb components, alternative methods have been devised to more quickly determine the spectral content of the received signals. Such methods include virtually-imaged phased-array (VIPA) spectroscopy and dual-comb spectroscopy (DCS). Any type of spectroscopic receiver may be used in the system of FIG. 7.

An important advantage of combining a TOF scanner with a spectrometer source and receiver as in FIG. 7 is that it enables rapid determination of 3D coordinates for detected chemical species. In a further embodiment, the scanner of FIG. 7 may be connected to accessory equipment that further supports the spectroscopy functions. For example, optical signals may be routed from an external source through a fiber-optic cable to the emission point of the source 170. Similarly, the output signal, either optical or electrical, may be routed from the spectroscopy receiver 174 out of the scanner for further analysis.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A laser scanner for optically scanning and measuring an object in an environment, the laser scanner comprising:
a light emitter configured to emit an emission light beam, an electromagnetic energy generator configured to emit a first electromagnetic energy, and a first beam splitter configured to combine the emission light beam with the first electromagnetic energy in a combined light and to send the combined light out of the laser scanner into the environment;
an optical system including at least one of a reflective optical component and a refractive optical component, the optical system receiving in operation a combined reflected light, the combined light reflected by the object and received by the at least one or a reflective optical component and a refractive optical component;
a second beam splitter configured to separate the combined reflected light into a reflected emission light and a reflected electromagnetic energy;
an optical receiver having a collecting lens and a detector, the optical receiver determining in operation a distance to a point on the object based at least in part on the reflected emission light with the detector;
a spectrometer receiver having a photosensitive detector that receives in operation the electromagnetic energy, the spectrometer receiver determines in operation a wavelength spectrum of the reflected electromagnetic energy received by the photosensitive detector; and
a control and evaluation unit having a processor and a data connection to the light emitter and the light receiver, the processor determining in operation a distance from the laser scanner to the point on the object, the determined distance based at least in part on a propagation time of the emission light beam and the reflection light beam.

2. The laser scanner of claim 1, further comprising a first angle measuring device operably coupled to the processor to provide in operation a first angle of the combined light out of the laser scanner.

3. The laser scanner of claim 2, further comprising a second angle measuring device operably coupled to the processor to provide in operation a second angle of the combined light out of the laser scanner.

4. The laser scanner of claim 3, wherein the the processor determines three-dimensional coordinates of the point.

5. The laser scanner of claim 4, wherein the electromagnetic energy generator generates electromagnetic energy in the infrared region.

6. The laser scanner of claim 5, wherein the electromagnetic energy generator generates one or more wavelengths between 3 and 15 micrometers.

7. The laser scanner of claim 5, wherein the electromagnetic energy generator includes a quantum cascade laser.

8. The laser scanner of claim 5, wherein the electromagnetic energy generator sweeps over a plurality of wavelengths.

9. The laser scanner of claim 8, wherein the spectrometer receiver determines in operation the wavelength spectrum of the reflected electromagnetic energy based at least in part on a correlation in time between reflected electromagnetic energy measured by the spectrometer receiver and the first electromagnetic energy emitted by the electromagnetic energy generator.

10. The laser scanner of claim 4, wherein the electromagnetic energy generates a comb of optical frequencies.

11. The laser scanner of claim 10, wherein the spectrometer receiver is a Fourier transform interferometer receiver.

12. The laser scanner of claim 11, wherein the spectrometer receiver includes a microelectromechanical interferometer.

13. The laser scanner of claim 10, wherein the spectrometer receiver includes one of a virtually-imaged phased-array spectrometer and a dual-comb spectrometer.

14. The laser scanner of claim 4, wherein the spectrometer receiver includes a grating configured to separate wavelengths.

15. The laser scanner of claim 14, wherein the separated wavelengths are projected onto the photosensitive detector.

16. The laser scanner of claim 4, further including a rotary mirror that directs in operation the combined light out of the laser scanner and to direct the combined reflected light back into the laser scanner.

17. The laser scanner of claim 4, wherein at least a portion of the electromagnetic energy generator is located outside a body of the scanner.

18. The laser scanner of claim 17, wherein electromagnetic energy is transferred from the electromagnetic energy generator over a fiber-optic cable.

19. The laser scanner of claim 4, wherein at least a portion of the spectrometer receiver is located outside a body of the scanner.

20. The laser scanner of claim 19, wherein at least a portion of the received electromagnetic energy is transferred to the spectrometer receiver over fiber-optic cable.

* * * * *